United States Patent [19]
Hashimoto

[11] Patent Number: 5,410,601
[45] Date of Patent: Apr. 25, 1995

[54] VIDEO SCRAMBLE SYSTEM AND EQUIPMENT

[75] Inventor: Takashi Hashimoto, Tokyo, Japan

[73] Assignee: Pioneer Electronic Corporation, Tokyo, Japan

[21] Appl. No.: 977,290

[22] Filed: Nov. 16, 1992

[30] Foreign Application Priority Data

Nov. 15, 1991 [JP] Japan .................. 3-300641
Feb. 14, 1992 [JP] Japan .................. 4-28454

[51] Int. Cl.$^6$ .................................. H04N 7/167
[52] U.S. Cl. .......................... 380/14; 380/15; 380/19
[58] Field of Search .............. 380/11, 14, 15, 19

[56] References Cited

U.S. PATENT DOCUMENTS

| | | |
|---|---|---|
| 4,458,268 | 7/1984 | Ciciora . |
| 4,673,975 | 6/1987 | Inaba et al. .............. 380/14 |
| 4,742,544 | 5/1988 | Kupnicki et al. ......... 380/14 |
| 5,034,981 | 7/1991 | Leonard et al. .......... 380/5 |

FOREIGN PATENT DOCUMENTS 8303942 11/1983 European Pat. Off. .
86/07226 12/1986 WIPO .

Primary Examiner—Stephen C. Buczinski
Attorney, Agent, or Firm—Sughrue, Mion, Zinn, Macpeak & Seas; Richard C. Turner; Marie Claire Baisvent

[57] ABSTRACT

The object of the present invention is to provide various scramble systems and equipments for embodying the scramble systems for omitting unqualified viewers in a pay TV system such as CATV.

One of the scramble system according to the present invention is characterized in that a horizontal blanking interval and a video signal interval in at least one specified horizontal scanning line are shifted with respect to the time axis thereof to be transmitted in combination with other horizontal scanning lines in which no shifting operation is conducted. Another scramble system is characterized in that a horizontal line in which a horizontal blanking interval is deleted and the remained video signal interval is shifted within the time interval equal to the thus deleted horizontal blanking interval in addition to the above system. A further scramble system apart from these systems is characterized in that a pedestal part of a specified horizontal scanning line within a vertical blanking interval is compressed with respect to the time axis thereof, whereas a pedestal part of another desired horizontal scanning line within the same field is expanded for a time interval corresponding to the thus compressed pedestal part. And, a still further scramble system is characterized in that an audio signal as well as the video signal is also scrambled.

5 Claims, 44 Drawing Sheets

FIG. 7

| ADDR. | VALUE |
|---|---|
| 0 0 | 0 |
| 0 1 | 1 3 0 |
| 1 0 | 7 8 0 |
| 1 1 | 0 |

FIG. 1 2

| ADDR. | VALUE |
|---|---|
| 0 0 | 0 |
| 0 1 | 7 8 0 |
| 1 0 | 1 3 0 |
| 1 1 | 0 |

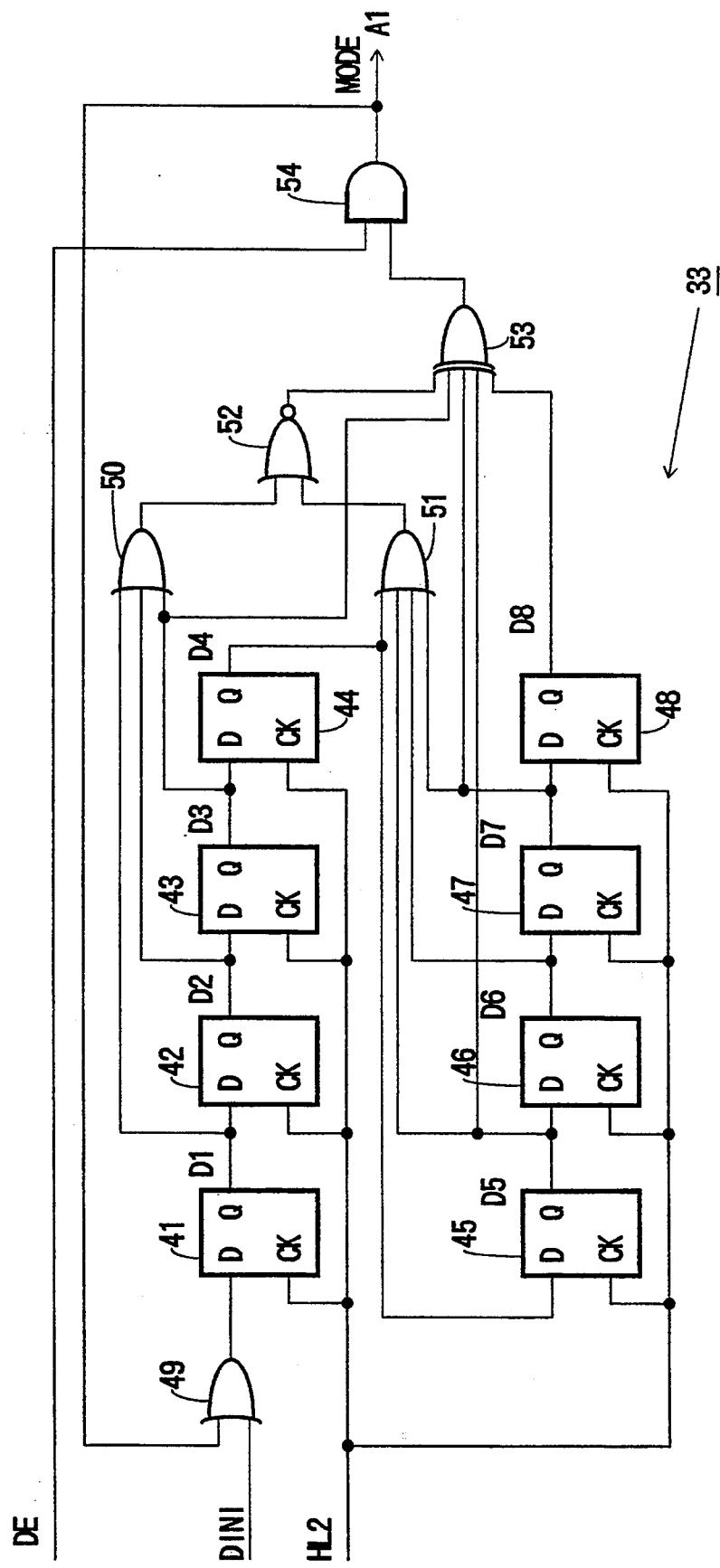

FIG. 21

| ADDR. | VALUE |
|---|---|
| 0000 | 0 |
| 0001 | 44 |
| 0010 | 88 |
| 0011 | 130 |
| 0100 | 780 |
| 0101 | 824 |
| 0110 | 868 |
| 0111 | 0 |
| 1000 | 0 |
| 1001 | 824 |
| 1010 | 868 |
| 1011 | 44 |
| 1100 | 0 |
| 1101 | 44 |
| 1110 | 868 |
| 1111 | 88 |

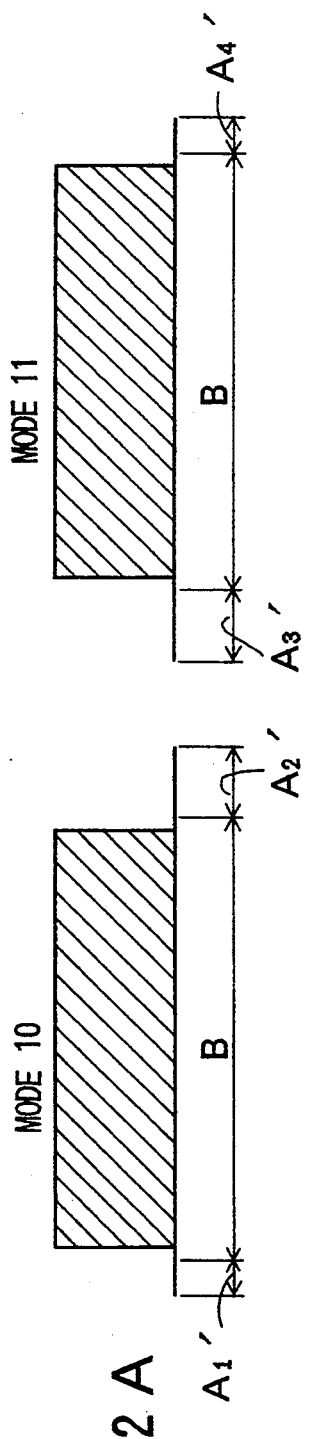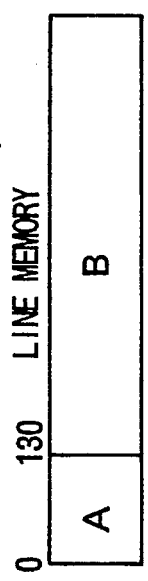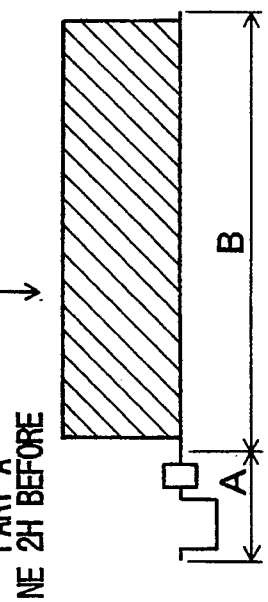
FIG. 22A
FIG. 22B
FIG. 22C

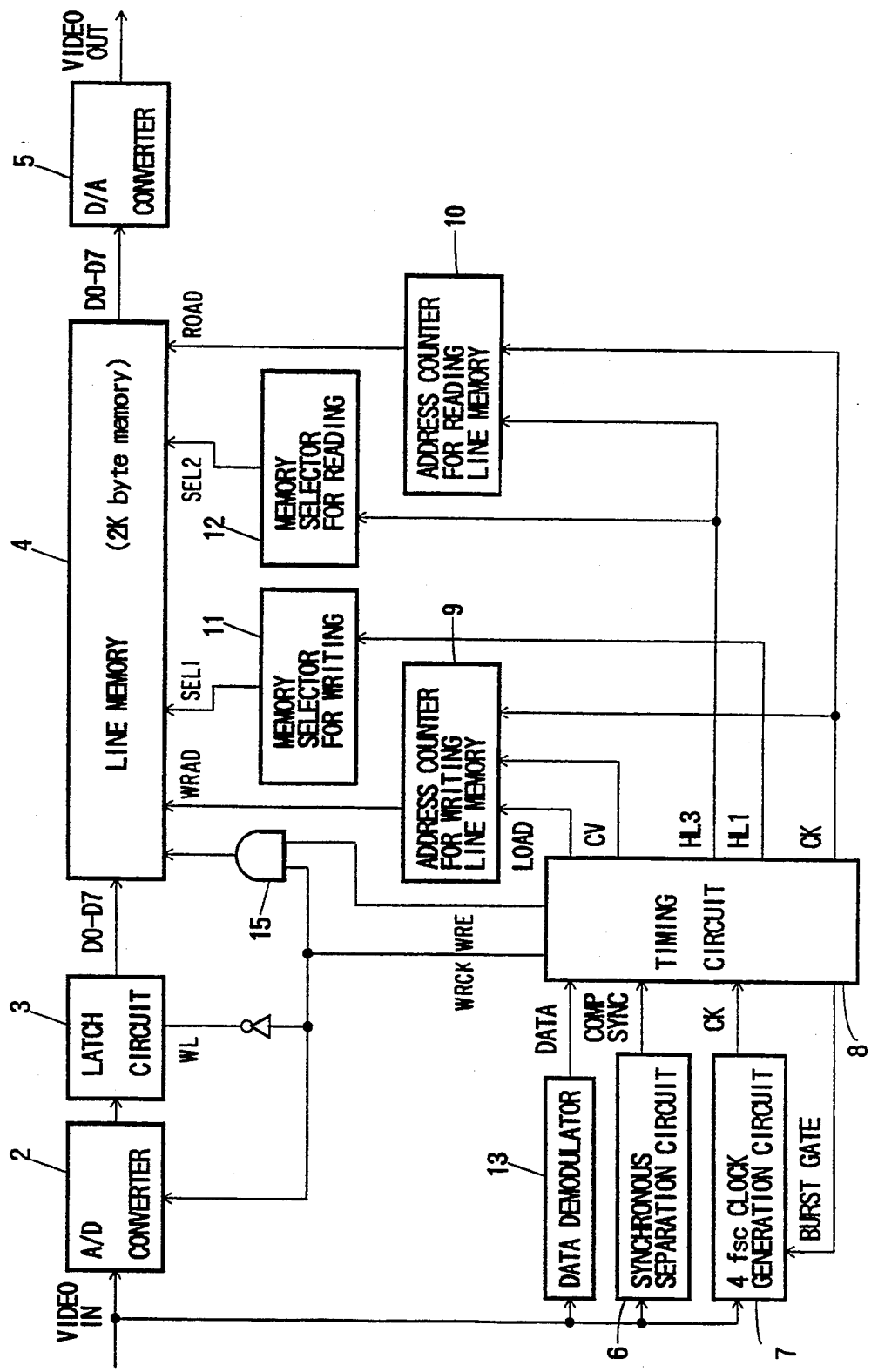

FIG. 26

| ADDR. | VALUE |
|---|---|
| 0 0 0 0 | 0 |
| 0 0 0 1 | 4 4 |
| 0 0 1 0 | 8 8 |
| 0 0 1 1 | 7 8 0 |
| 0 1 0 0 | 1 3 0 |
| 0 1 0 1 | 1 7 4 |
| 0 1 1 0 | 2 1 8 |
| 0 1 1 1 | 0 |
| 1 0 0 0 | * * * |
| 1 0 0 1 | 1 3 0 |
| 1 0 1 0 | 1 7 4 |
| 1 0 1 1 | 8 6 8 |
| 1 1 0 0 | * * * |
| 1 1 0 1 | * * * |
| 1 1 1 0 | 1 3 0 |
| 1 1 1 1 | 8 2 4 |

FIG. 32

|   | OFFSET | HL3-HL1 | DELAY |
|---|--------|---------|-------|
| 0 | 0 0 0  | 9 1 0   | 8 0 0 |
| 1 | 0 0 1  | 8 1 0   | 7 0 0 |
| 2 | 0 1 0  | 7 1 0   | 6 0 0 |
| 3 | 0 1 1  | 6 1 0   | 5 0 0 |
| 4 | 1 0 0  | 5 1 0   | 4 0 0 |
| 5 | 1 0 1  | 4 1 0   | 3 0 0 |
| 6 | 1 1 0  | 3 1 0   | 2 0 0 |
| 7 | 1 1 1  | 2 1 0   | 1 0 0 |

VIDEO SCRAMBLE SYSTEM AND EQUIPMENT

BACKGROUND OF THE INVENTION

1. Field of the Invention

The present invention relates to various video scramble systems and equipments embodying these scramble systems for omitting unqualified watchers in a pay television system such as CATV.

2. Description of the Prior Art

In a pay television system such as CATV, scrambling to video signal is being conducted in order to avoid unqualified TV watchers. Hitherto, such comparatively simple systems have been adopted as the gray-sync system in which a synchronizing signal is suppressed using modulation by an encode signal having such phase relation as suppressing a horizontal synchronizing signal, and as the inverted video system in which the modulation polarity of a video signal is inverted to be transmitted.

However, when one of the above mentioned system is used, while low cost decoders are provided, it was easy to manufacture devices for tapping, so that it has been a difficult problem to realize a perfect avoidance of these unqualified watchers.

On the other hand, in the satellite TV broadcasting system or the like, scramble systems having high grade of concealment such as the line permutation system or the line rotation system utilizing digital signal processing are adopted, but it was found out that these scrambling systems were not suitable to CATV system because of the fact that a decoder for these systems could be very expensive due to a complexity of the digital signal processing itself.

The present invention has been accomplished based on the above mentioned situations, and the object of the invention is to provide a new video scramble system and an equipment which is of rather low cost and having high grade of concealment of scramble, yet making it difficult to manufacture tapping equipments for decoding the scramble.

SUMMARY OF THE INVENTION

A first scramble system according to the present invention is characterized in that two kinds of horizontal scanning lines are transmitted in a combined form, wherein one type is a horizontal scanning line in which a Horizontal Blanking Interval (hereinafter this may be referred to simply as HBI) signal and a Video Signal Interval (hereinafter this may be referred to simply as VSI) signal are shifted in time series mode each other, and the other type is a horizontal scanning line (hereinafter this may be referred to simply as H line) in which no shifting operation is conducted therein.

A second scramble system according to the present invention is characterized in that three kinds of horizontal scanning lines are transmitted in a combined form, wherein one type is a horizontal scanning line in which HBI signal and a VSI signal are shifted in time series mode each other, the second type is a horizontal scanning line in which no shifting operation is conducted therein, and the other type is a horizontal line in which a HBI signal is deleted and the remained VSI signal is shifted within the time interval equal to the thus deleted HBI signal.

A third scramble system according to the present invention is characterized in that a pedestal part of the specified horizontal scanning line within a vertical blanking interval is compressed with respect to the time axis thereof, and a pedestal part of another desired horizontal scanning line within the same field is expanded for a time interval corresponding to the thus compressed pedestal part.

A fourth scramble system according to the present invention is characterized in that a sound signal is also scrambled in addition to any of the above first, second and third video signal scramble systems.

A first scramble equipment according to the present invention is composed by applying the first scramble system, and has a feature which has such means that a HBI signal and a VSI signal in a horizontal scanning line are shifted in time series mode each other.

A second scramble equipment according to the present invention is composed by applying the second scramble system, and has a feature which has such means that a HBI signal and a VSI signal in a horizontal scanning line are shifted in time series mode each other, and a HBI signal in a randomly specified horizontal scanning line is deleted and the thus remained VSI signal in the specified scanning line is optionally shifted within the time interval equal to the deleted HBI signal.

A third scramble equipment according to the present invention is composed by applying the third scramble system, and has a feature which has such means that a pedestal part of the specified horizontal scanning line within a vertical blanking interval is compressed with respect to the time axis thereof, and a pedestal part of another desired horizontal scanning line within the same field is expanded for a time interval corresponding to the thus compressed pedestal part.

A fourth scramble equipment according to the present invention is composed by the fourth scramble system, and has a feature which has such means that a sound signal is also scrambled as well as the video signal.

A first descramble equipment according to the present invention is composed by applying the first scramble system, and is provided with a means for descrambling a horizontal scanning line in which a HBI signal and a VSI signal are shifted in time series mode each other.

A second descramble equipment according to the present invention is composed by applying the second scramble system, and is provided with means for descrambling a horizontal scanning line in which a HBI signal and a VSI signal are shifted in time series mode each other, and for descrambling a horizontal scanning line in which the HBI signal therein is deleted and the remained VSI signal is optionally shifted within the time interval equal to the thus deleted HBI signal.

A third descramble equipment according to the present invention is composed by applying the third scramble system, and is provided with a means for expanding a pedestal part which is compressed with respect to the time axis thereof in a specified horizontal scanning line within a vertical blanking interval, and for compressing a pedestal part which is expanded with respect to the time axis thereof in a desired horizontal scanning line within the same field.

A fourth descramble equipment according to the present invention is composed by applying the fourth scramble system, and is provided with a means for descrambling both the sound and video signals scrambled by the fourth scramble equipment.

In the present invention, the scrambling operation is accomplished by a method in which a HBI signal and a VSI signal in a horizontal scanning line specified by a pseudo random signal or the like are shifted in time series mode each other to be transmitted.

Also, the scrambling operation is accomplished by a method in which a HBI signal and a VSI signal in the horizontal scanning line specified by a pseudo random signal or the like are shifted in time series mode each other, and at the same time a HBI signal in a horizontal scanning line apart from the above already scrambled horizontal scanning line is deleted, and the thus remained VSI signal is optionally shifted within the time interval equal to the thus deleted HBI signal.

Furthermore, the scrambling operation is accomplished by a means in which a pedestal part of a specified horizontal scanning line within a vertical blanking interval is compressed for a predetermined time interval, and a pedestal part of another desired horizontal scanning line within the same field is expanded for a time interval corresponding to the thus compressed pedestal part, whereby a synchronizing signal is disturbed due to the response characteristics of the synchronizing detection circuit of television, and thus a horizontal scanning line can be disturbed in any arbitrary position of a screen.

As mentioned above, since scrambling and descrambling operations are accomplished without processing a video signal itself, it is possible to effectively avoid non-subscribers' unfair TV watching, yet maintaining a picture quality of CATV. Also, in order to specify a horizontal scanning line to be scrambled, pseudo random signals generated by a random number generator etc. can be used.

BRIEF DESCRIPTION OF THE DRAWINGS

For a better understanding of the present invention, reference is made to the following description in conjunction with the drawings, in which:

FIGS. 3A to 3B illustrate a diagram indicating a decoding method in the first video scramble system altogether, wherein FIG. 3A shows a horizontal scanning lines respectively scrambled and unscrambled;

FIG. 7 is a table indicating an example of a writing address table for encoding;

FIG. 11 is a schematic diagram indicating a concrete example of the mode selector included in FIG. 10;

FIG. 12 is a table indicating an example of a writing address table for decoding;

FIG. 21 is a table indicating an example of a writing address table for encoding;

FIGS. 22A to 22C show a diagram indicating a decoding method in the second video scramble system;

FIG. 23 is a schematic diagram indicating one practical example of a video descramble equipment composed by applying the second video scramble system;

FIG. 26 is a table indicating an example of a writing address table for decoding;

FIG. 32 is a table indicating an example of a delay time table for the third scramble system;

DETAILED DESCRIPTION OF THE PREFERRED EMBODIMENTS

In the following, several embodiments of the present invention are described with reference to the accompanying drawings.

FIG. 1 is a theoretical explanation diagram of a first video scramble system according to the present invention. This figure indicates an embodiment in which the first scramble system is applied to a video signal of the NTSC system, wherein a HBI signal A and a VSI signal B in a Horizontal Scanning line (which may be referred to simply as H line hereinafter) are shifted in time series mode each other. It is to be noted that this first scramble system according to the present invention is hereinafter referred to as the DPSS (Dynamic Picture Shift Scrambling) system.

Figure 4:
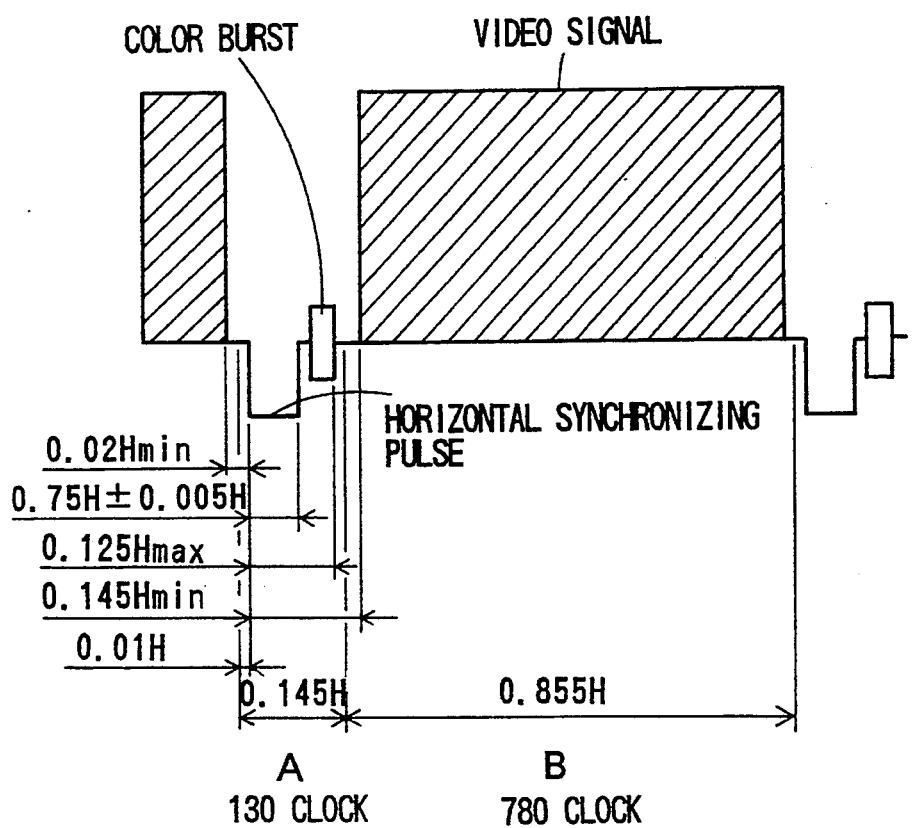
FIG. 4 is a diagram showing a waveform structure (per 1 H) of a video signal in the NTSC system.

Now, a video signal waveform (for 1 H line) in the NTSC system has such a composition as shown in FIG. 4. When this video signal for 1 H line is divided into 2 parts, that is, a HBI A (hereinafter referred to as part A) and a VSI B (hereinafter referred to as part B), each interval of part A and part B is respectively 0.145 H(9.2 $\mu$sec) and 0.855 H(54.34 $\mu$sec). When the sampling rate with which a video signal is converted from Analog signal to Digital signal is assumed to 4 fsc (fsc: chrominance subcarrier 3.58 MHz) for processing the scrambling operation, each interval is respectively 130 clock pulses and 780 clock pulses being substituted by sampling clock pulses. Therefore, overall clock pulses of 1 H shall be 910 clock pulses.

Figures 1A, 1B, 1C:
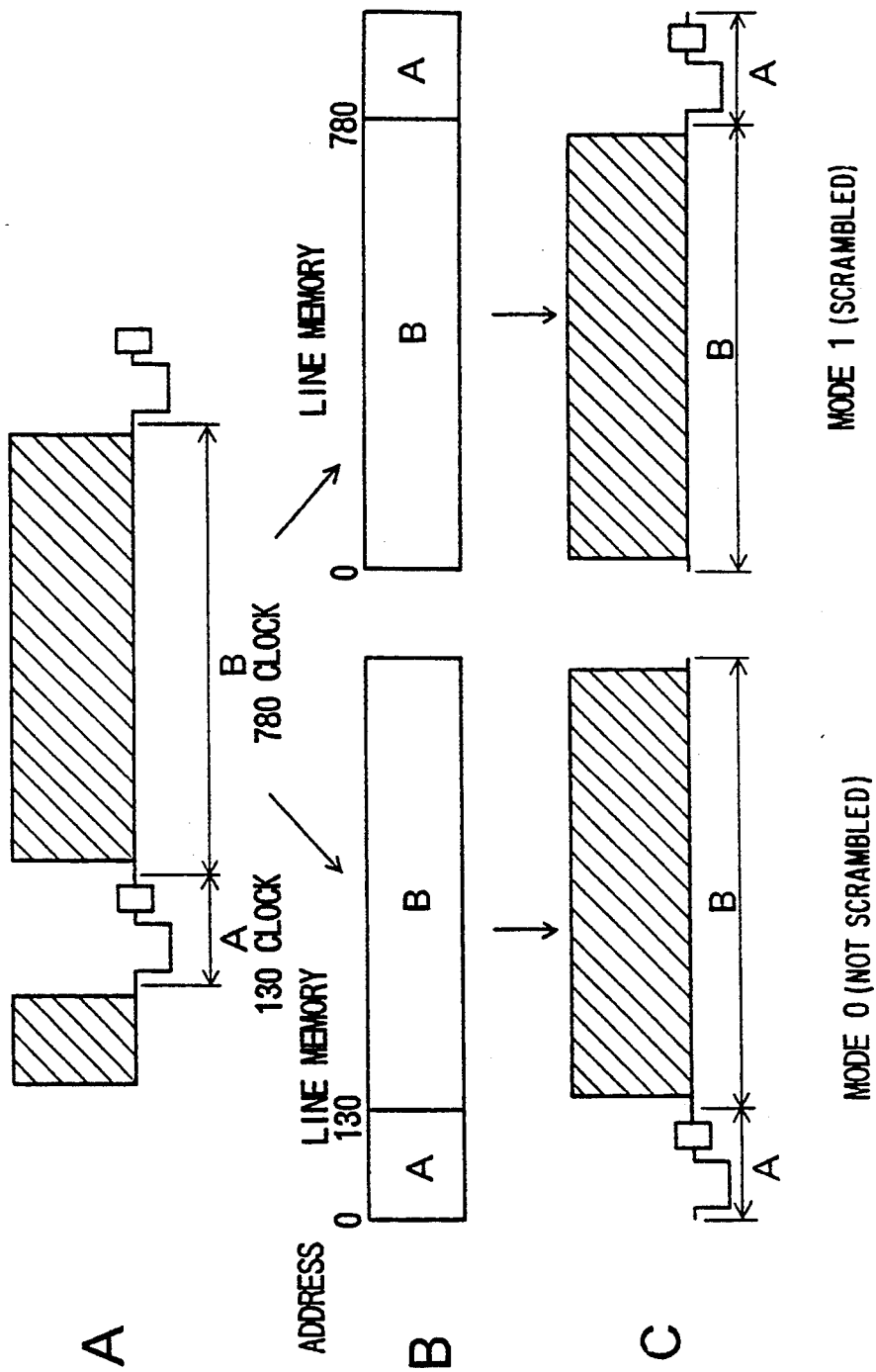
FIGS. 1A to 1C illustrate a theoretical explanation diagram of a first video scramble system according to the present invention.

In the DPSS system of the present invention, when a video signal shown in FIG. 1A which is set to the above mentioned clock pulse relation is written to the line memory shown in FIG. 1B, with respect to the H line randomly specified by a pseudo random signal or the like, part A is written in the line memory from the address 780, and part B is written therein from address 0 as shown in FIG. 1B right side, thereafter these signals are read out from address 0 in order. Accordingly, a converted video signal in which the part A signal and part B signal are shifted in time series mode each other is outputted. And this scrambled mode is called MODE 1.

On the other hand, as for the H line not randomly specified, after the art A and part B are written in the line memory from the address 0 in order as it is in accordance with the time series as shown in FIG. 1B left side, a normal video signal in which part B is arranged next to the part A is outputted. Hereinafter, this unscrambled mode is called MODE 0.

Figure 2:
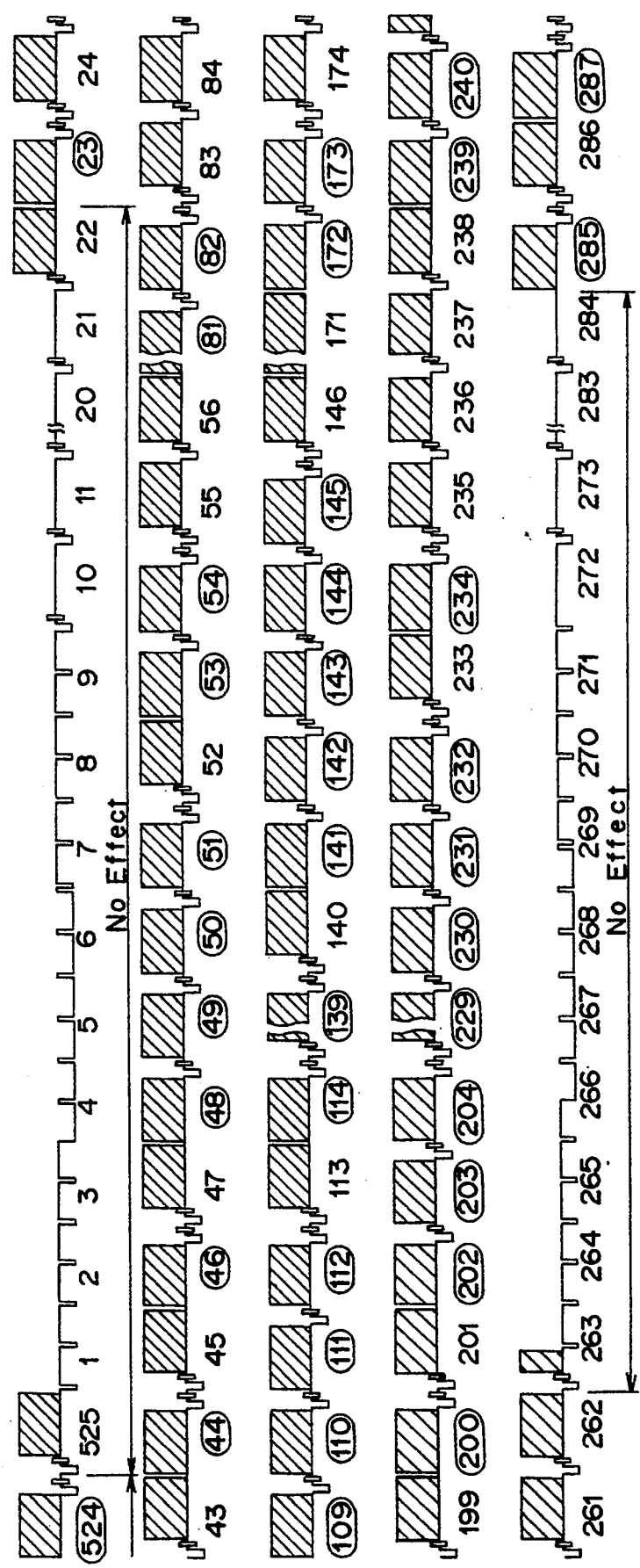
FIG. 2 is a waveform chart showing a video signal for over one field, when scrambled by using the first video scramble system.

A waveform example of one field of a video signal which is scrambled by using the DPSS system is shown in FIG. 2. the H lines enclosed with a circle is the lines scrambled. But, the vertical blanking interval (hereinafter may be referred to as VBI) signal is not scrambled. It depends on a pseudo random signal used as to which of the H lines are to be scrambled.

Figure 3:
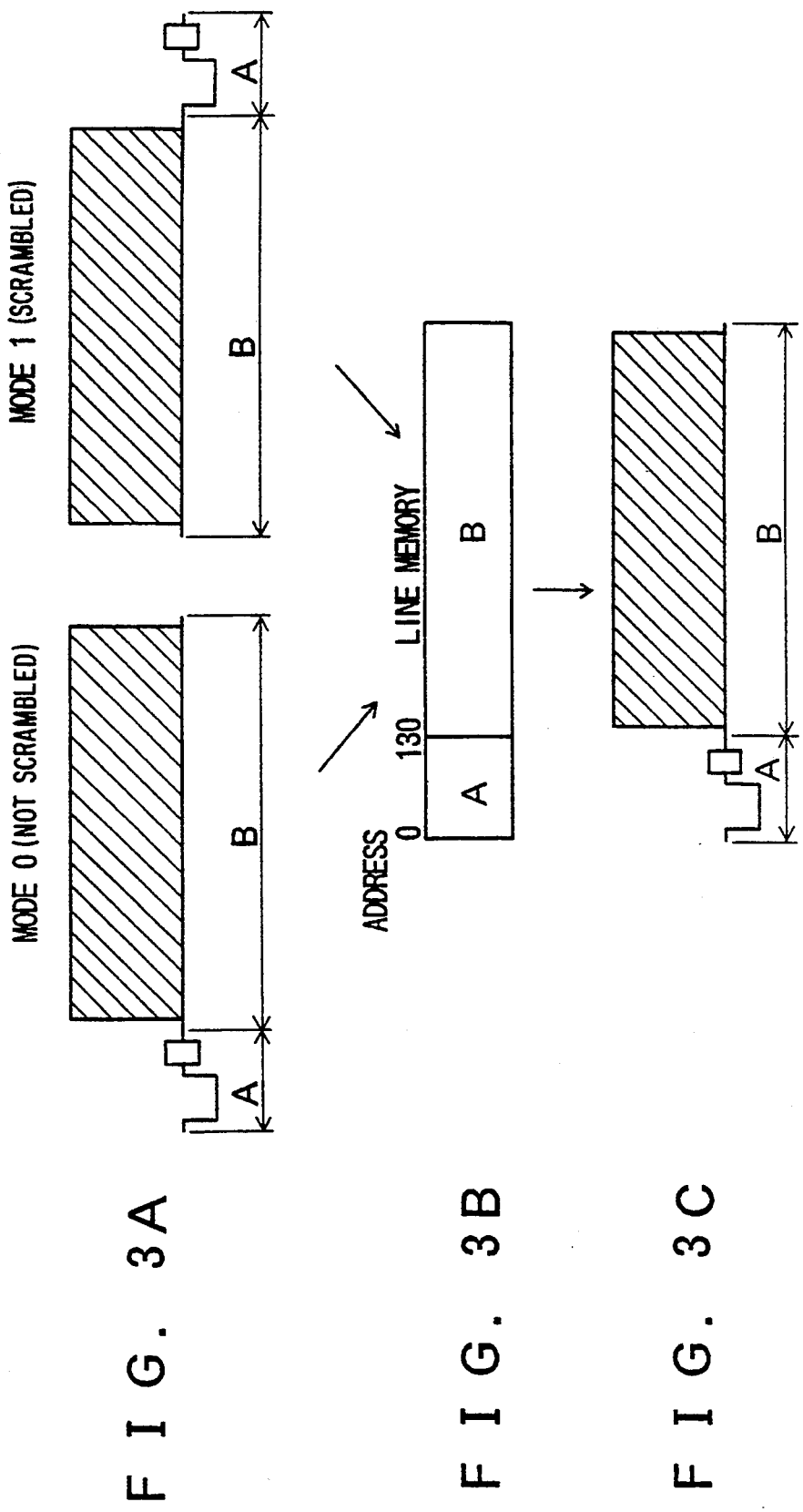

The decoding method for a video signal scrambled in the DPSS system is shown in FIG. 3. With respect to the H line not scrambled and shown in left side of FIG. 3A, when a signal is written in the line memory of FIG. 3B, the part A and part B are written from the address 0 in order as it is in accordance with the time series, and it may be read from address 0 in order. Hereby, A normal video signal in which the part B is arranged next to the part A is obtained as shown in FIG. 3C.

On the other hand, with respect to the H line scrambled shown in the right side of FIG. 3A, when a signal is written in the line memory of FIG. 3B, the signal of part B is written from the head address 130 to address 909, and thereafter the signal of the part A is written from address 0 to address 129, it may be read out from address 0 in order. Hereby, a normal video signal in which the part B is arranged next to the part A is thus obtained as shown in FIG. 3C.

In order to detect H line scrambled and H line not scrambled, the same random number generator as that of the transmitting side is also set up in the receiving side, the initial value of the generated random number used in the transmitting side is set to the random number generator of the receiving side as well, and it may be accomplished by generating the same pseudo random signal as that of the transmitting side.

Figure 5:
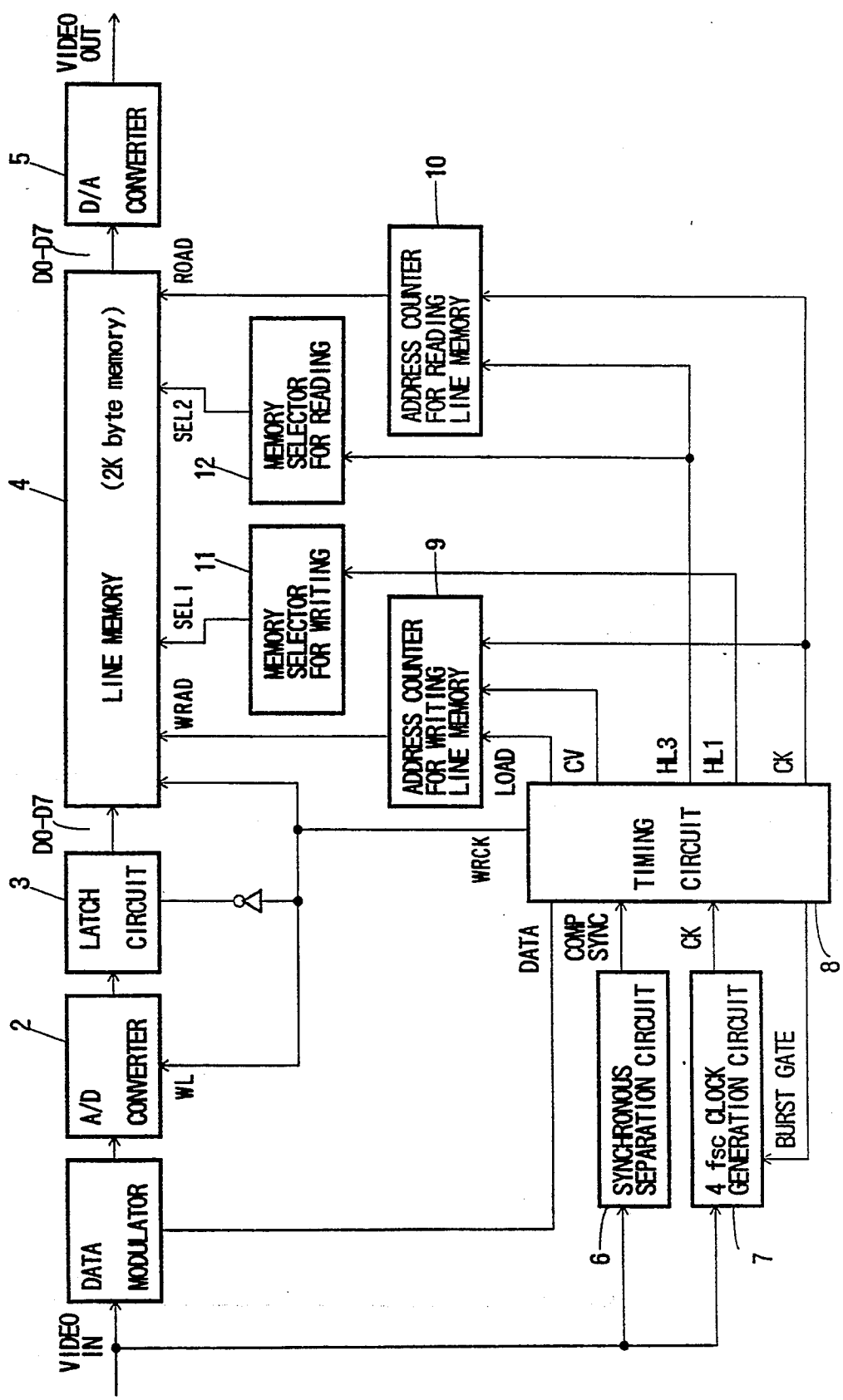
FIG. 5 is a schematic diagram indicating one practical example of a video scramble equipment composed by applying the first video scramble system.

One embodiment of a video scramble equipment (encoder) composed by applying the DPSS system is shown in FIG. 5. In the figure, reference numeral 1 denotes a data modulator that superimposes scramble information such as a program ID and an initial value of the generated random number on the VBI part of a video signal; numeral 2 denotes a A/D converter, 3 denotes a latch circuit; and 4 denotes a line memory circuit. This line memory circuit 4 has two line memories previously built therein, each of which comprises 1 K-byte capacity, wherein a video signal is intended to be written and read out alternately line by line, by such a method in which while one line memory acts a reading operation, the other line memory acts a writing operation.

Reference numeral 5 denotes a D/A converter; numeral 6 denotes a synchronous separation circuit for extracting synchronizing pulses from the video signal; numeral 7 denotes a 4 fcs clock pulse generation circuit for extracting a color burst signal and generating a clock signal composed of frequencies four times as high as that of chrominance subcarrier; 8 denotes a timing circuit; 9 denotes an address counter for writing in the line memory; 10 denotes an address counter for reading out the line memory; 11 denotes a line memory selector for writing, and 12 denotes a line memory selector for reading out.

An inputted video signal is superimposed by required data such as program ID and initial value of the generated random number in the data modulator 1. This multiplexing operation is conducted by using the same method as the closed caption system already known which is one kind of the teletext, for example, at two positions; the line 11H, 12H and the lines 274H and 275H of a video signal.

A video signal in which data is multiplexed as mentioned above is sampled with 4 fcs clock in the A/D converter 2, converted to digital data, and then sent to the line memory circuit 4 with the specified timing rate via the latch circuit 3. For writing the thus extracted signal Go the line memory circuit 4, it is written in such a relation of address as shown in FIG. 1 under the control of the address counter for writing 9 etc. variably depending on whether or not each of the H lines are to be scrambled.

Also, synchronizing pulses are extracted from an inputted video signal in the synchronous separation circuit 6, and the video signal is sent to the timing circuit 8. As a color burst signal is positioned immediately after a horizontal synchronizing pulse of 0.05 H, a burst gate signal is generated in the timing circuit 8 and it is further sent to 4 fcs clock generation circuit 7, whereby the color burst signal is extracted by gating to the video signal, and 4 fcs clock generation circuit 7 is chroma-locked. The timing circuit 8 operates using this frequency 4 fcs as the basic clock thereafter.

Figure 6:
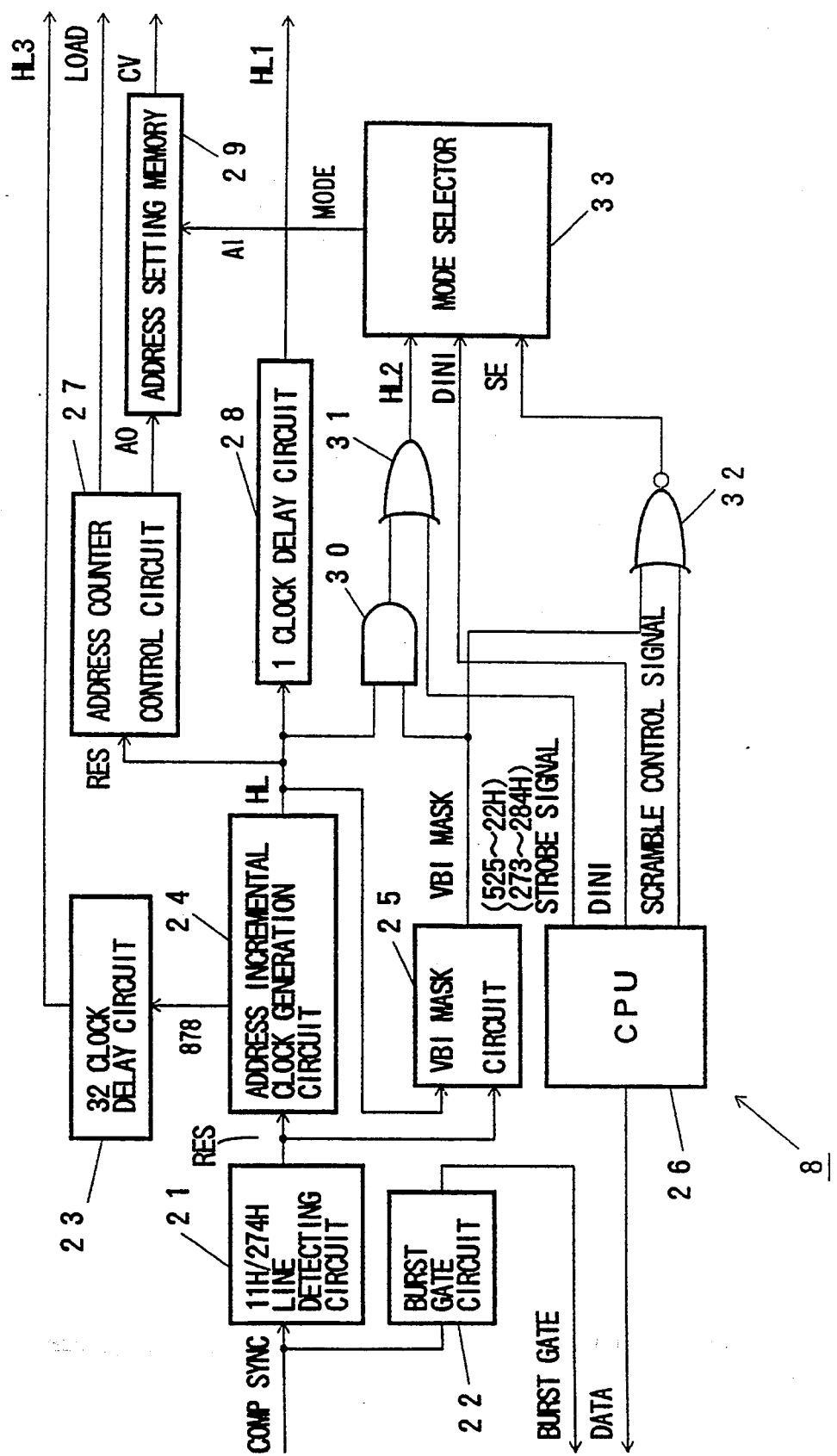
FIG. 6 is a schematic diagram indicating a concrete example of the timing circuit included in FIG. 5.

A concrete example of the timing circuit 8 is shown in FIG. 6. It is to be noted, however, that a clock signal sent from the 4 fcs clock generation circuit 7 is not shown. 11H/274H line detecting circuit 21 generates a reset pulse RES at the starting position of each of the lines 11H and 274H. And, the burst gate circuit 22 sends a burst gate signal to the 4 fcs clock generation circuit 7 in order to gate to a video signal and extract a color burst signal.

An address incremental clock generation circuit 24 is reset and synchronized by the reset pulse RES outputted from the 11H/274H line detecting circuit 21 at the line 11H and 274H of each field, whereas it runs freely at other lines and output H line pulse HL every 1 H line.

A VBI mask circuit 25 generates a mask signal which prevents to scramble the vertical blanking interval of the lines between 535H and 22H, and those between 263H and 284H in accordance with the reset pulse signal RES and the H line pulse HL outputted at the line 11H and 274H. This VBI mask signal is mixed with a scramble control signal outputted from CPU 26 at NOR gate 32, and then sent to the mode selector (random number generator) 33 as a scramble enable signal SE. That is, the VBI mask signal is set to "L" to release scramble at the VBI position, and scramble is stopped by setting the scramble control signal from the CPU 26 always as "L".

Figure 8:
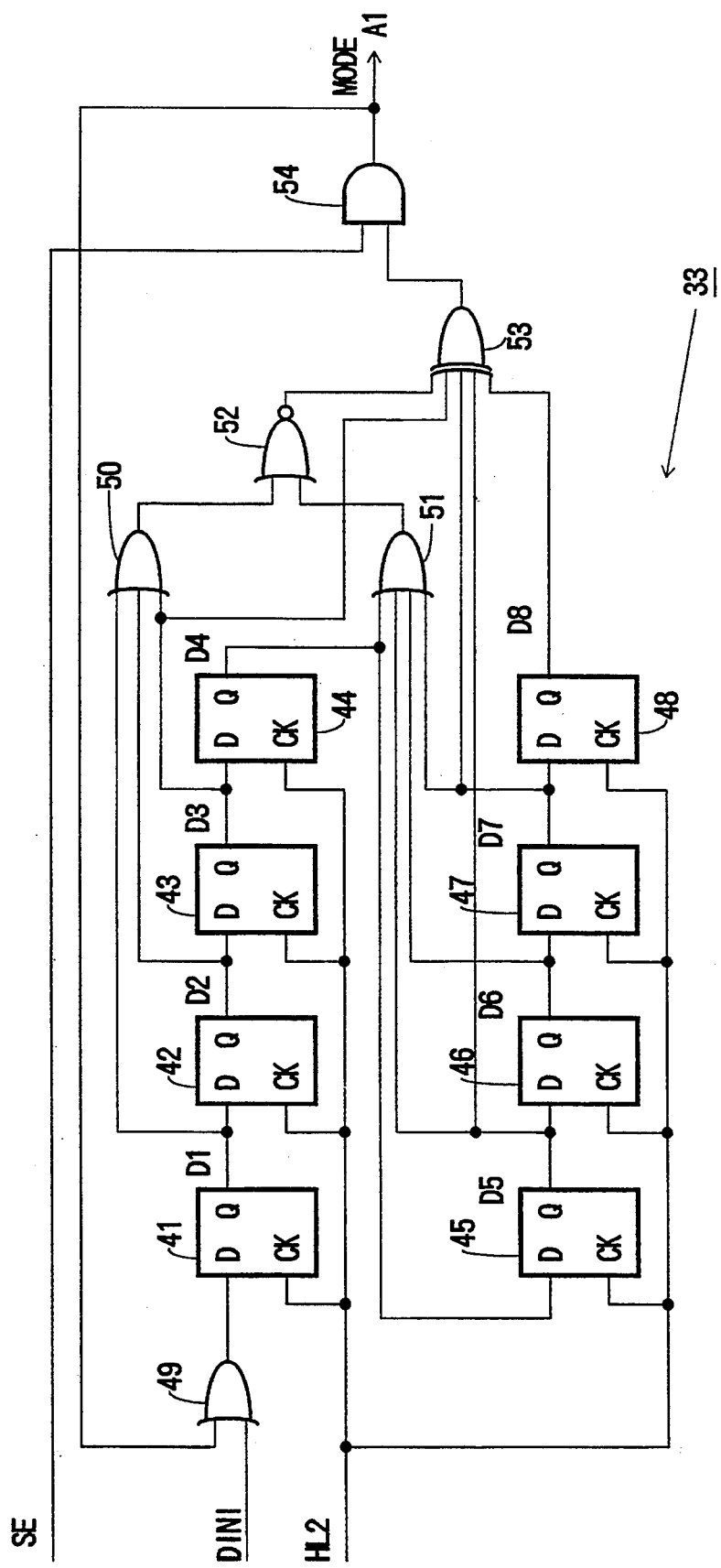
FIG. 8 is a schematic diagram indicating a concrete example of the mode selector included in FIG. 6.

HL2 signal is the signal masking the VBI part of H line pulse HL by the VBI mask signal. In the VBI part of a video signal, a strobe signal for loading the initial value for generating a random number to the random number generator in the mode selector 33 (described later, in FIG. 8) is sent via the OR gate 31. The CPU 26 generates the initial value DINI for generating a random number and this strobe signal, and sends them to the mode selector 33.

HL3 signal is a timing pulse for reading. This HL3 is obtained by such a method that a pulse of the 878th clock is outputted from the address incremental clock generation circuit 24, and this pulse is delayed in the 32 clock delay circuit 23 for 32 clock pulses which are the maximum permissible jitter generation time in a normal signal system. HL1 signal is a timing pulse for writing in contrast to HL3 signal, and is generated by delaying the H line pulse HL for 1 clock by the 1-clock delay circuit 28.

The address counter control circuit 27 outputs a load pulse LOAD to the address counter for writing 9 at the 0th clock and the 130th clock which are the starting points of the respective part A and part B of a video signal in order to set the address of the line memory at which each of the these parts A and B of a video signal should be written, and it also outputs the lower bit A0 of the address ADDR for an address table (FIG. 7) described later to the address setting memory 29. The address counter for writing 9 increments the counter value (address) synchronizing with clocks, after the head address CV for writing the specified address position is read based on the load pulse LOAD from the address setting memory 29.

The counter value of the address counter for writing 9 is used for specifying address 0 to 909 of each of the two line memories which are previously built in the line memory circuit 4. The specification to which of the two line memories are to be read out is conducted by an output signal SEL1 of the writing line memory selector 11. This SEL1 is in an inverse phase relationship with the output signal SEL2 of the reading out line memory selector 12, wherein during one line memory is in the writing condition, the other line memory is in the reading out condition, that is, two line memories in the line memory circuit 4 are alternately switched over to the writing mode and the reading mode at very 1 H line.

The address setting memory 29 is a ROM in which an address table is stored as shown in FIG. 7. The address table of FIG. 7 is the table for specifying the head address that indicates as to from which position of the line memory the video signals at the 0th clock and 130th clock of each H line should start to be written (hereinafter referred to simply as a writing head address). The upper bit of the address ADDR specifies whether or not the scramble is to be conducted, wherein 0 indicates MODE 0 (not scrambled), and 1 indicates MODE 1 (scrambled). Also, the lower bit of the address ADDR specifies the clock position, wherein 0 indicates the 0th clock and 1 indicates the 130th clock.

Therefore, in the table of FIG. 7, ADDR.00 indicates that the writing head address of the 0th clock to the line memory in MODE 0 (not scrambled) is address 0, and ADDR.01 indicates that the writing head address of the 130th clock to the line memory in MODE 0 (not scrambled) is address 130. Also, ADDR.10 indicates that the writing head address of the 0th clock to the line memory in MODE 1 (scrambled) is address 780, and ADDR. 11 indicates that the writing head address to of the 130th clock to the line memory in MODE 1 (scrambled) is address 0.

The mode selector 33 is a random number generator which is composed of registers 41 to 48, OR gate 49 to 51, NOR gate 52, EXOR gate 53 and AND gate 54. The initial value DINI of the generated random number is set to registers 41 to 48 by pulse HL2 during the VBI. And, as SE signal is set to "H" in the line 23H (refer to FIG. 2), and synchronized with H line pulse clock HL2, the pseudo random signal A1 is outputted to the address setting memory 29 from AND gate 54 in accordance with the following logical equation.

A1=D8 XOR D7 XOR D5 XOR D3 XOR NOT
(D1 OR D2 OR D3 OR ... OR D7)

This pseudo random signal A1 provides the upper bit of the address ADDR. of the table shown is FIG. 7. And a scramble waveform shown in FIG. 2 is a waveform example in which the initial value of the generated random number is assumed as "1" in the mode selector 33 shown in FIG. 8.

Figure 9:
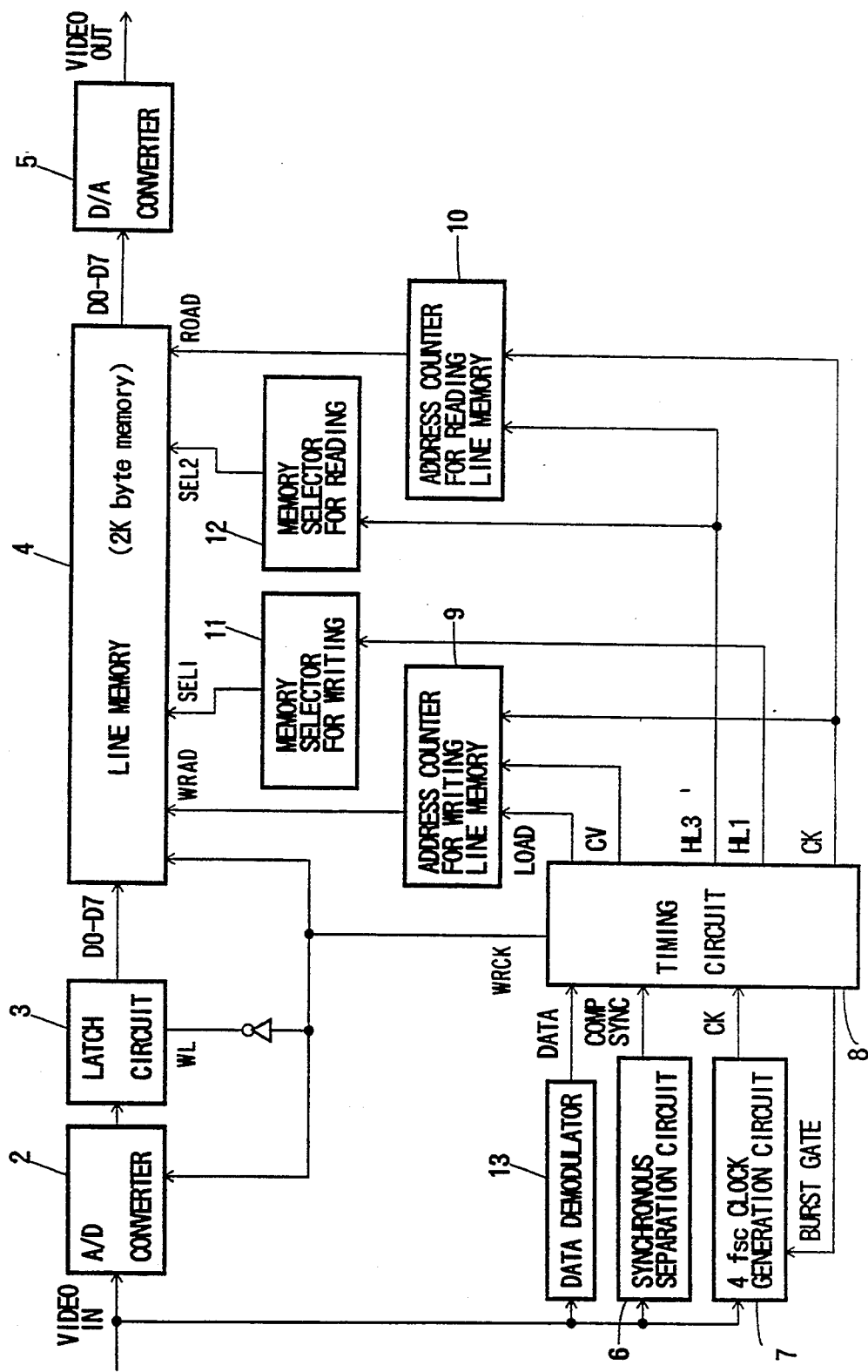
FIG. 9 is a schematic diagram indicating one practical example of video descramble equipment composed by applying the first video scramble system.
Figure 10:
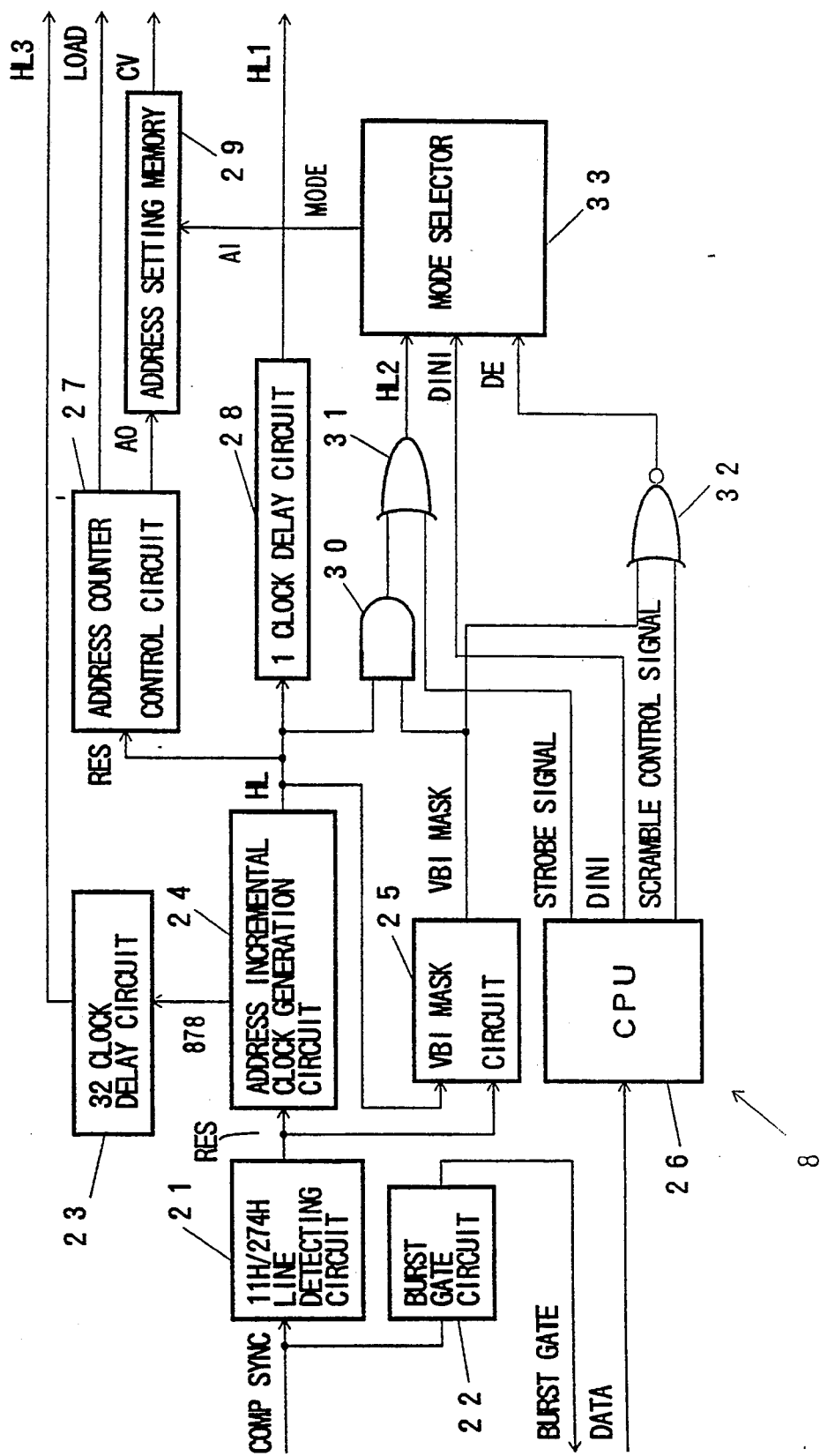
FIG. 10 is a schematic diagram indicating a concrete example of the timing circuit included in FIG. 9.

FIG. 9 to FIG. 11 indicate one embodiment of the video descramble equipment (decoder) composed by applying the DPSS system of the present invention. And, the circuit composition of the descramble equipment shown in FIG. 9 to FIG. 11 are theoretically same as the scramble equipment (encoder) of the transmitting side, with the exception that the data demodulator 13 is provided instead of the data modulator 1 shown in FIG. 5, that the address table for descramble shown in FIG. 12 is stored in the address setting memory 29 shown in FIG. 10 which sets the writing head address to the line memory, and that the timing for writing to the line memory circuit 4 is different. Therefore, same symbols are provided to denote like or corresponding portions shown in FIG. 5 to FIG. 8, and detailed description thereof is also omitted.

The same mode selector (random number generator) as that of the transmitting side is provided to the descramble equipment as shown FIG. 11, whereby a scramble mode of each H line of the received video signal is decided. when the descrambling operation is started, the same initial value as that set in the scrambling operation conducted in the transmitting side is required to provide to the registers of the random number generator. For this reason, the scramble equipment shown in FIG. 5 transmits a program ID and a generated random number in a multiplexed form from the data modulator 1. This data-multiplexing position is set at two points; the lines 11H, 12H and lines 274H and 275H in the VBI part of a video signal. Thus, 32-bit data can be sent by using two lines per 1 field. The initial value for generating a random number may be sent in two points; at one line of the present field and the same line one field before, and may also be compared with the check code so as to improve reliability of communication.

In the random number generator shown in FIG. 11, the initial value DINI for generating a random number sent from the scramble equipment is set to the registers for generating a pseudo random signal, whereby the pseudo random signal A1 generated in the descramble equipment side is entirely the same pattern as that generated in the scramble equipment side. Therefore, it is possible to specify the H line scrambled by using this pseudo random signal A1.

Writing video signal data to the line memory is conducted in accordance with the address table of FIG. 12. That is, ADDR.00 indicates that the writing head address of the clock to the line memory in MODE 0 is address 0, and ADDR.01 indicates that the writing head address of the 780th clock to the line memory in MODE 0 is address 780 in FIG. 12. Also, ADDR.10 indicates that the writing head address of the 0th clock to the line memory in MODE 1 is address 130, and ADDR.11 indicates that the writing head address of the 780th clock to the line memory in MODE 1 is address 0. Therefore, by writing a video signal to the line memory in accordance with the table of this FIG. 12, a video signal as shown in FIG. 3B is written to the line memory, and then the scramble is released by reading out the video signal in order of address as shown in FIG. 3C.

Figure 13:
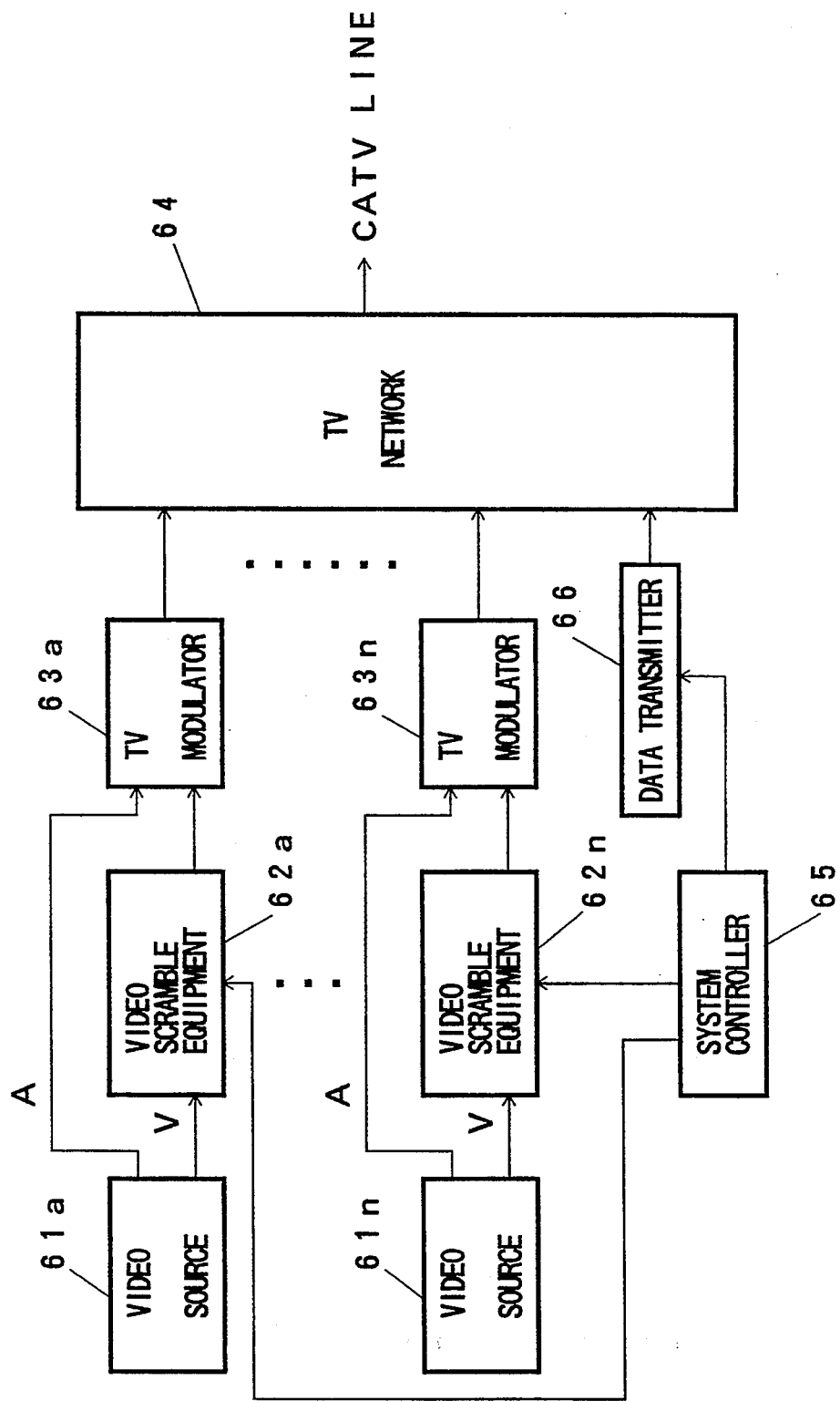
FIG. 13 is a schematic diagram indicating an example of an equipment configuration in the CATV center composed by using the video scramble equipment of the present invention.
Figure 14:
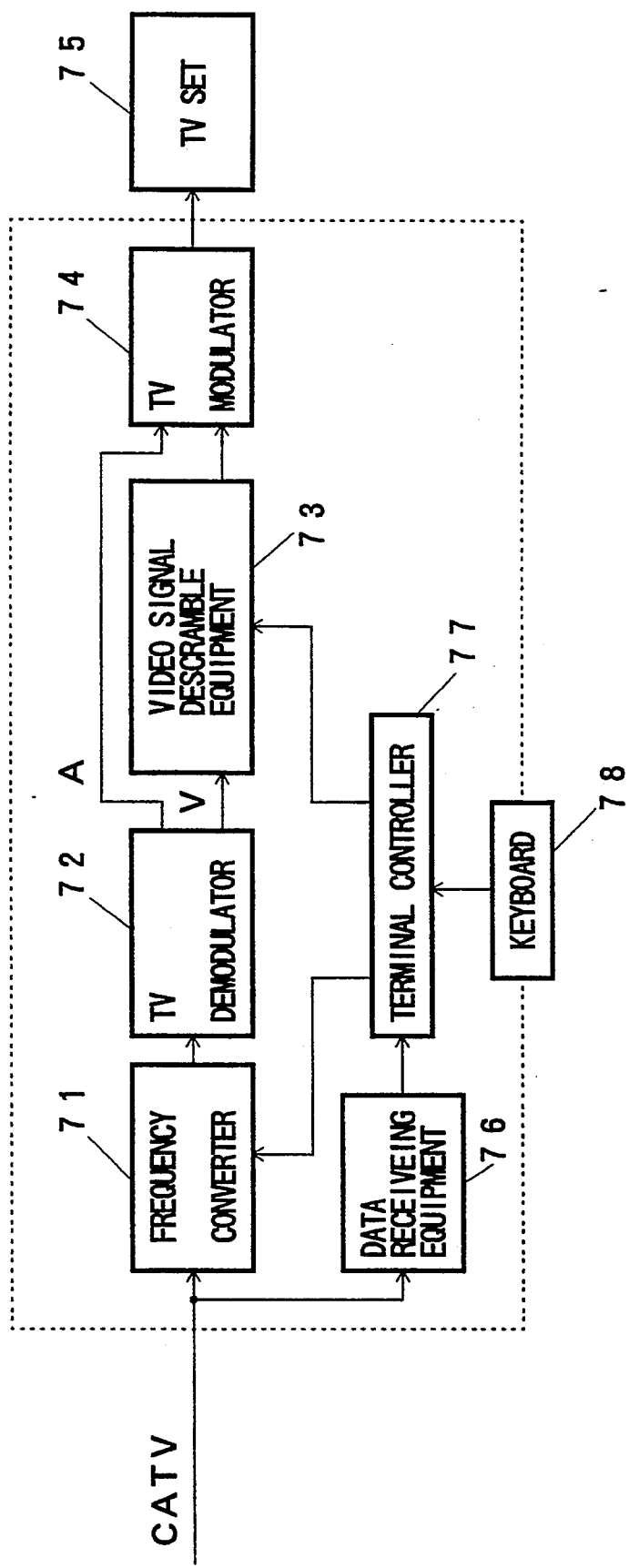
FIG. 14 is a schematic diagram indicating an example of an equipment configuration in subscriber terminals composed by using the video descramble equipment of the present invention.

An equipment composition example of CATV center composed by using the video scramble equipment of the present invention is shown in FIG. 13, and an equipment composition of a subscriber terminal is shown in FIG. 14.

The video scramble equipment (encoder) 62a-62n of the present invention is connected between the video source 61a-61n and the TV modulator 63a-63n, and a video signal is scrambled. A system controller 65 sends such a program ID to a subscriber terminal that permits a TV watching in accordance with the contract level of each subscriber by using the data transmitter (data TX) 66 via data channel. Also, the program ID is sent to each video scramble equipment 62a-62n too. Each video scramble equipment 62-a-62n superimposes this program ID on the VBI part of a video signal, and sends it via a transmission network (TX network) 64.

The subscriber terminal shown in FIG. 14 comprises a frequency converter for CATV signal 71, a TV demodulator 72, a video descramble equipment (decoder) 73, a TV modulator 74, a TV set for subscriber 75, a data receiving equipment (data RX) 76 which receives data sent by the data channel, a terminal controller 77, and a keyboard 78.

The subscriber terminal shown in FIG. 14 receives data sent by the data channel by data RX 76, and memorizes all ID program numbers which are permitted to watch by CATV center in the terminal controller 77 as the ID list. When a subscriber selects the scrambled program by using the keyboard 78, the program ID which is multiplexed in the VBI part of the video signal of the received program and the program ID list which is memorized in the terminal controller 77 are compared, whereby when both ID are identical, a decoding operation with respect to the scrambled program is permitted to the video descramble equipment 73 of the present invention.

Security of a scramble data can be raised up more efficiently by utilizing the data channel. For example, creating a cryptogram key of 8 bits created in the system controller 65 of the CATV center may be sent to each video scramble equipment 62a-62n.

In each video scramble equipment 62a-62n, the initial value of a random number used for generation of the scramble mode and the cryptogram key of 8 bits are operated as XOR (exclusive logical sum), thereafter this value is multiplexed in the VBI part of a video signal as the initial value and transmitted.

In the subscriber terminal, the cryptogram key sent by the data channel is previously stored in the descramble equipment 73, and the correct initial value is recovered by using such a method that the initial value data separated from VBI and the cryptogram key memorized are XORed every one field, and it is used as the data for the mode selector (random number generator) in the descramble equipment 73. By beams of this method, the VBI data of a video signal becomes meaningless for a tapping device which does not know the cryptogram key, and security can thereby be raised up.

Figure 15:
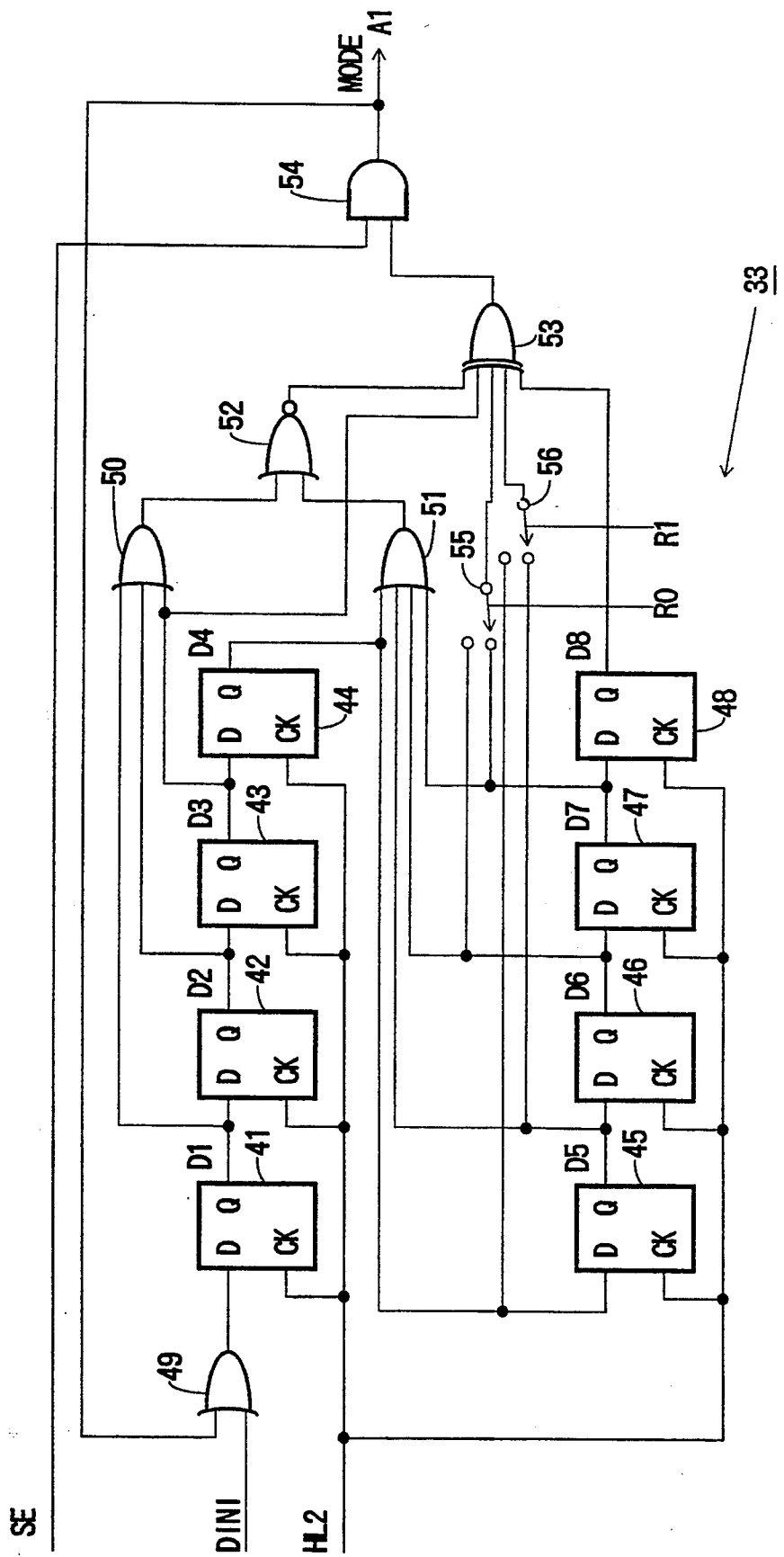
FIG. 15 is a schematic diagram indicating another example of a mode selector used for the present invention.

An example of the mode selector 33 which is capable of changing an equation for generating random number is shown in FIG. 15. The following four kinds of random number A1 can be generated in this circuit depending on the value of the switching signal R0 and R1 provided to the switches 55 and 56.

When R0=0, R1=0
A1=D8 XOR D7 XOR D5 XOR D3 XOR NOT (D1 OR D2 OR D3 OR ... OR D7)
When R0=0, R1=1
A1=D8 XOR D6 XOR D5 XOR D3 XOR NOT (D1 OR D2 OR D3 OR ... OR D7)
When R0=1, R1=0
A1=D8 XOR D7 XOR D4 XOR D3 XOR NOT (D1 OR D2 OR D3 OR ... OR D7)
When R0=1, R1=1
A1=D8 XOR D6 XOR D4 XOR D3 XOR NOT (D1 OR D2 OR D3 OR ... OR D7)

The more reliable security can be secured by using the following method. That is, the above 2-bit data R0, R1 are set by the system controller 65 of the CATV center, and it is sent to the subscriber terminal having the same mode selector as the one shown in FIG. 15, then, the data R0, R1 are set to the mode selector of the descramble equipment 73 of the subscriber terminal.

Next, the second scramble system according to the present invention will be described.

This second scramble system is such a system that the scramble system shown in FIGS. 16A to 16D is added to the scramble system using the DPSS system as additional mode. That is, the additional mode of FIGS. 16A to 16D is such a system that the part A of the H line randomly specified except those H lines already scrambled by the DPSS system is deleted, and a video signal is intended to scramble by shifting the part B within the time interval equal to the thus deleted part A. And in the following description, this second scramble system according to the present invention is referred to as the EDPSS (Extended Dynamic Picture Shift Scrambling).

Also, hereinafter, the scramble mode MODE 0 (not scrambled) which is described in the above mentioned DPSS is denoted as MODE 00, and MODE 1 (scrambled by DPSS system) as MODE 01. The EDPSS system provided with the additional mode which provides time shift as shown in FIG. 16C left side is denoted as MODE 10, and the EDPSS system provided with the additional mode which provides time shift as shown in FIG. 16C right side is denoted as MODE 11.

Figures 16A, 16B, 16C, 16D:
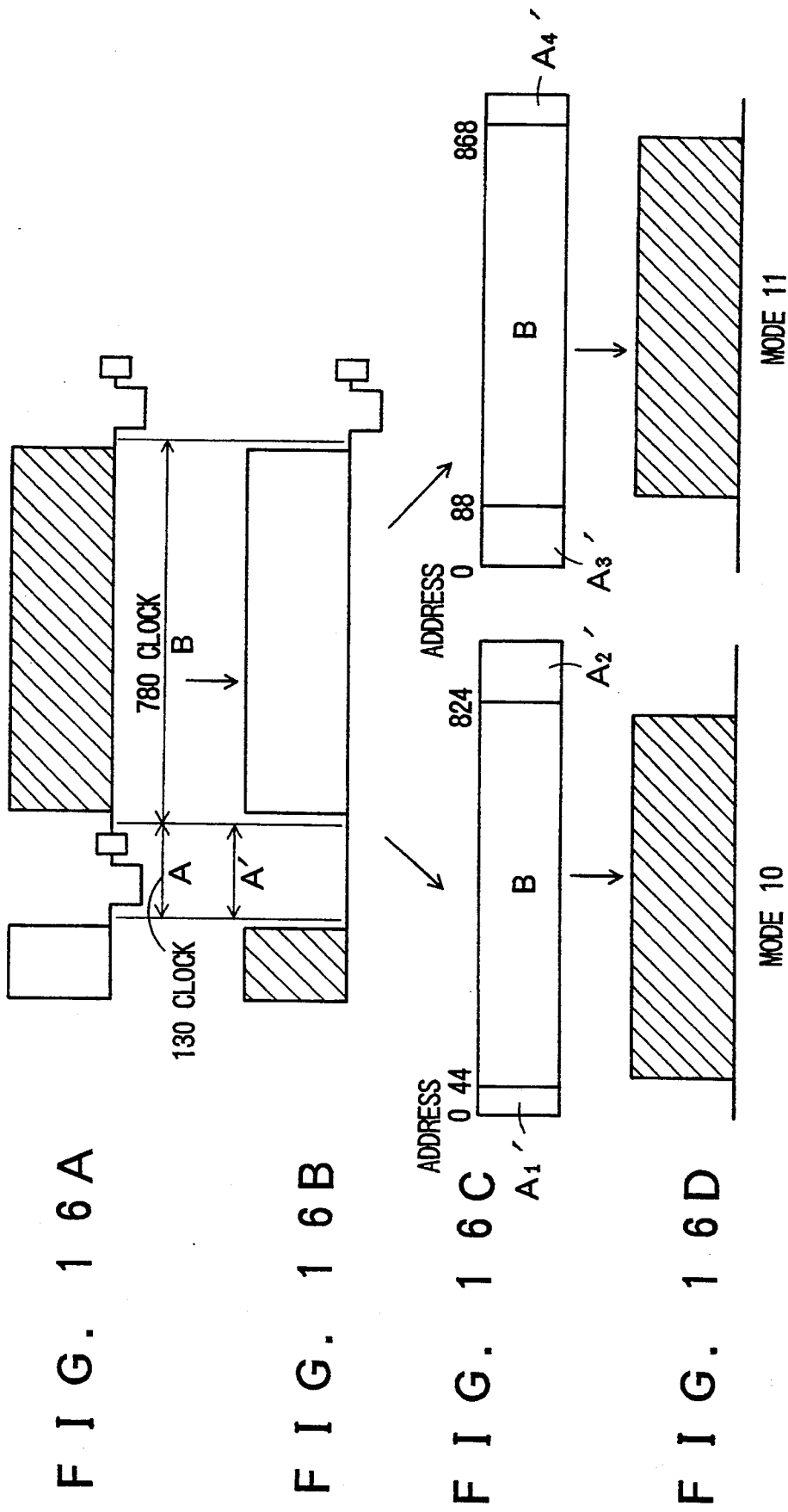
FIGS. 16A to 16D altogether show a theoretical explanation diagram of a second video scramble system according to the present invention.

The additional mode shown in FIGS. 16A to 16D is such a system that the synchronizing data of 130 clock of the part A is deleted from the original video signal shown in FIG. 16A as shown in FIG. 16B, and after the remained part B is time-shifted for specified clocks and written to the line memory as shown FIG. 16C, it is read out from address 0 in order, whereby part A of the video signal is deleted and the video signal in which the B part is time-shifted is obtained as shown in FIG. 16D. It is to be noted that each address 44, 824, 88, 868 which indicates the time-shifted position noted in FIG. 16C is only one example, it goes without saying that any other value can be adopted.

Figure 17:
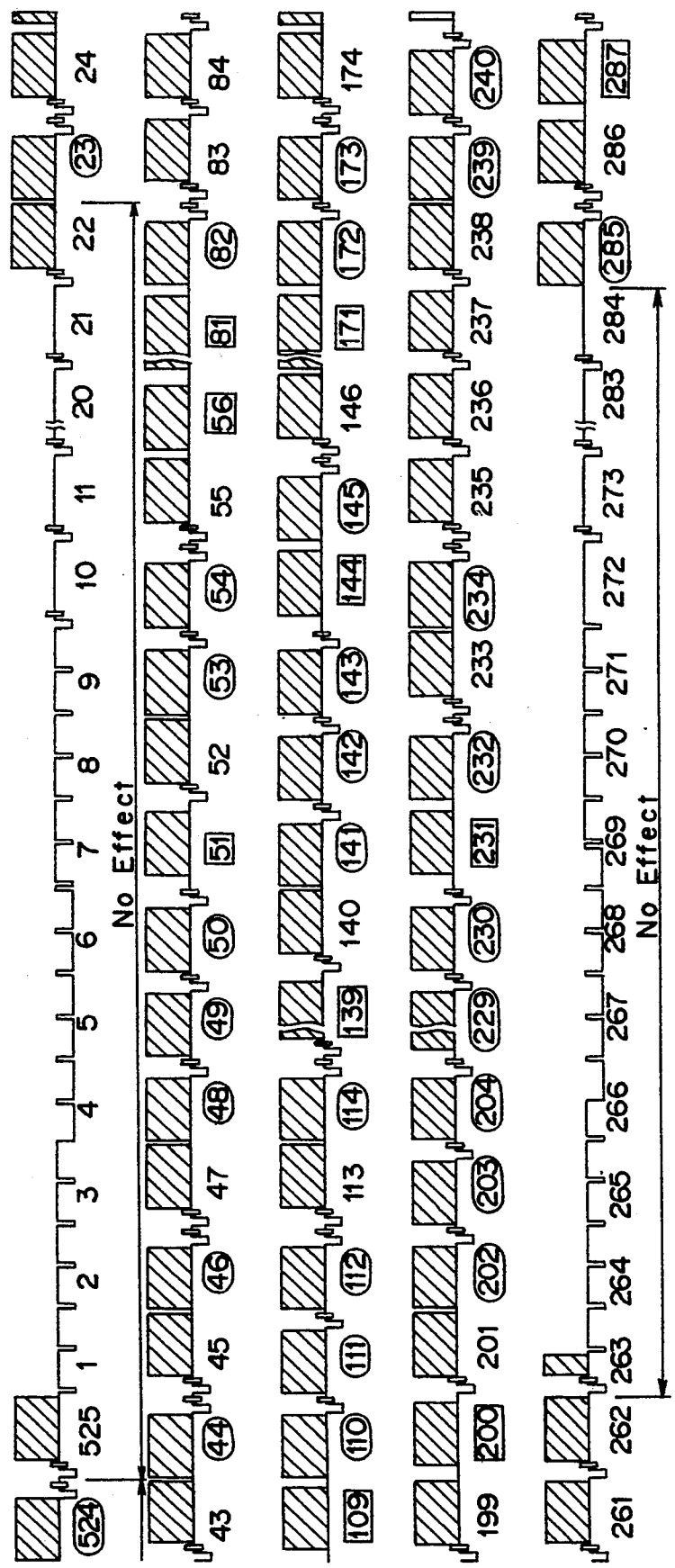
FIG. 17 is a waveform chart showing a video signal for over one field, when scrambled by using the second video scramble system.

A waveform example of the video signal of one field scrambled by using the EDPSS system is shown in FIG. 17. H lines enclosed with a circle are the lines scrambled by the DPSS system, and the H lines enclosed with a square are those scrambled by the additional mode of FIGS. 16A to 16D.

Figure 18:
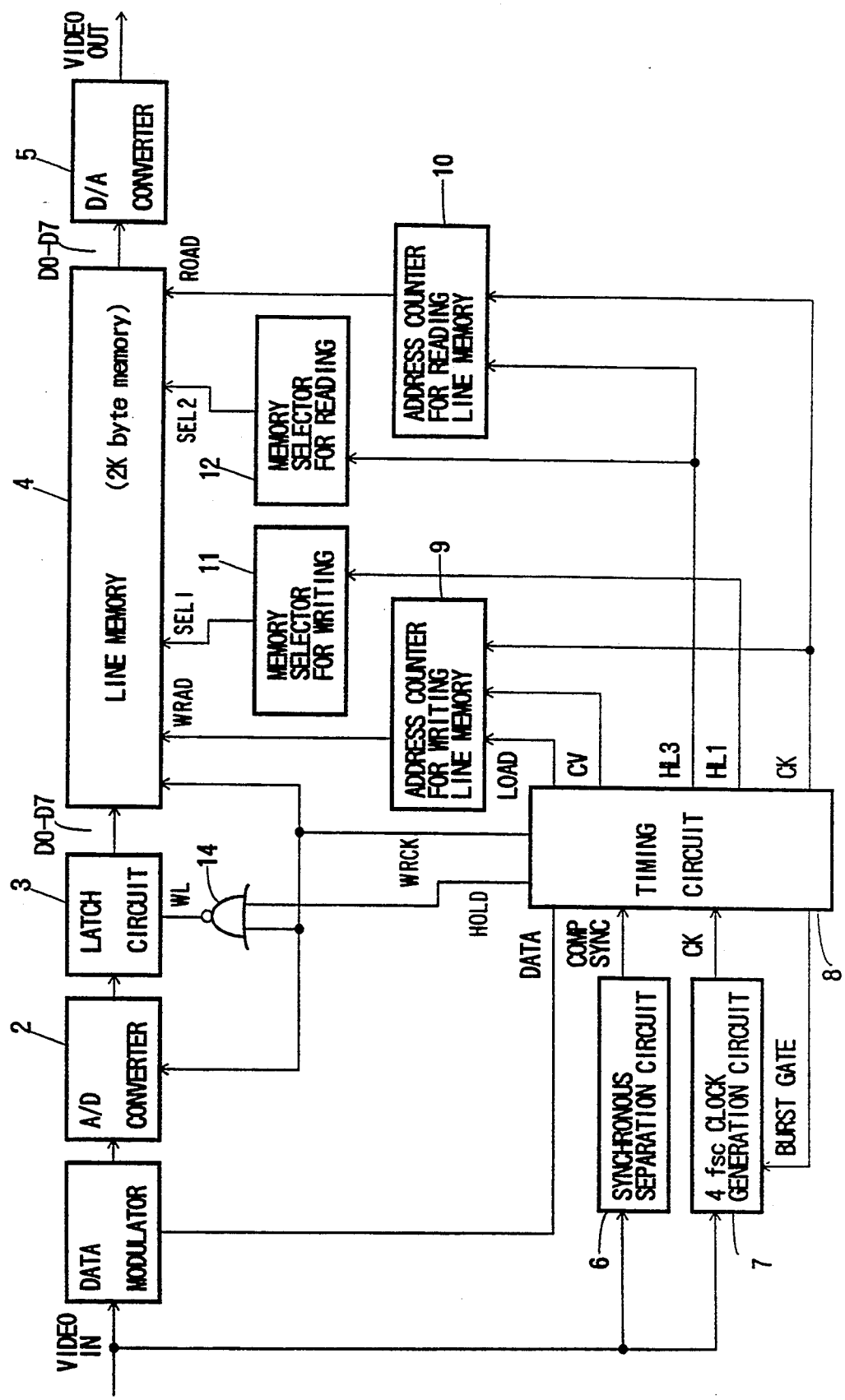
FIG. 18 is a schematic diagram indicating one practical example of a video scramble equipment composed by applying the second video scramble system.
Figure 19:
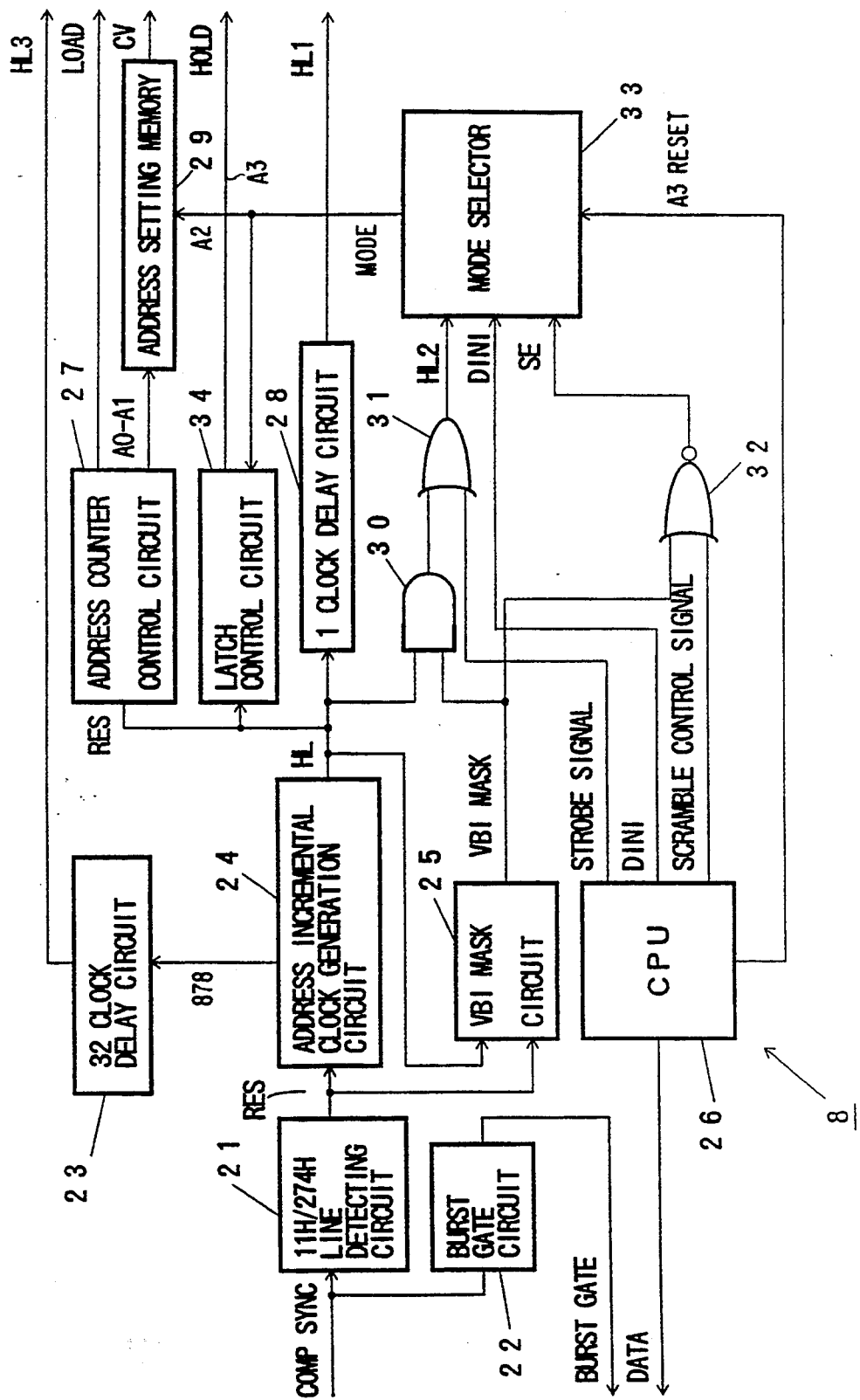
FIG. 19 is a schematic diagram indicating a concrete example of the timing circuit included in FIG. 18.
Figure 20:
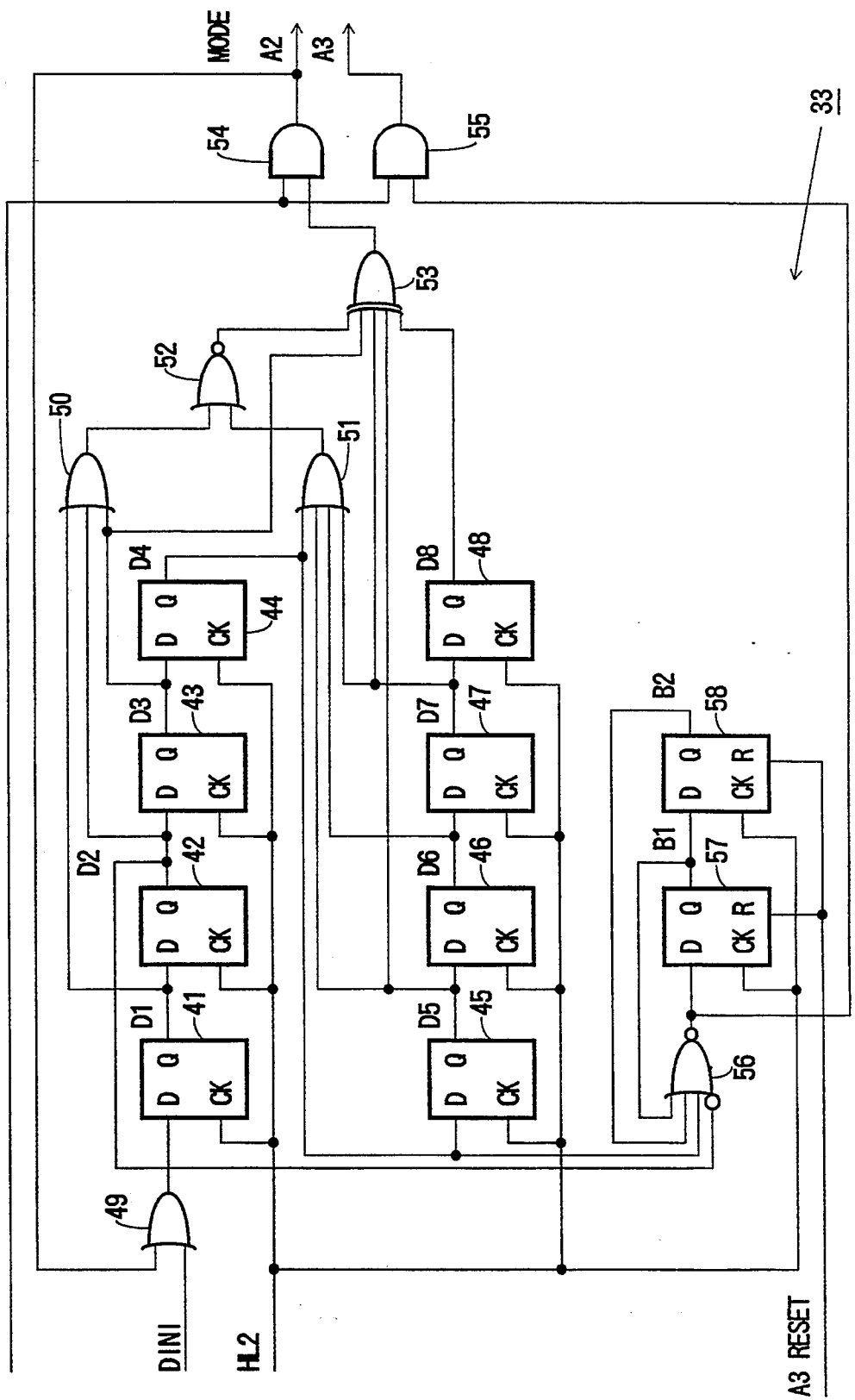
FIG. 20 is a schematic diagram indicating a concrete example of the mode selector included in FIG. 19.

An embodiment of the video scramble equipment composed by applying the above EDPSS system is shown in FIG. 18 to FIG. 20, wherein FIG. 18 shows the entire composition of the video scramble equipment, FIG. 19 shows a composition of the timing circuit 8, and FIG. 20 shows the mode selector 33. Also, same symbols are used for same part as the circuit shown in FIGS. 5, 7 and 8.

In the EDPSS system, the hold signal HOLD which fixes the latch circuit 3 (FIG. 18) is generated in the latch control circuit 34 (FIG. 19) in the timing circuit 8 in order to delete the part A of a video signal. Therefore, HOLD signal becomes "H" within the time interval of the part A, writing clock WRCK which is otherwise sent to the latch circuit 3 via NOR gate 14 comes to a halt so as to stop the latching operation.

Also, in the scramble equipment illustrated, the table shown in FIG. 21 is stored in the address setting memory 29 in order that the writing head address of a video signal to the line memory can be changed also at the 44th clock and the 88th clock of the additional mode shown in FIGS. 16A to 16D in addition to the 0th clock and the 130th clock which are the starting points of the part A and part B respectively.

In FIG. 21, the upper 2 bits of the address ADDR indicate scramble modes to be used, and respectively correspond A3, A2 bit outputted from the mode selector 33 of FIG. 20.

When these upper 2 bits are (0 0), EDPSS by MODE 00 (=MODE 0) of FIG. 1 is indicated, thus, when (0 1), MODE 01 (=MODE 1) of FIG. 1, when (1 0), MODE 10 of FIG. 16D, and when (11), MODE11 of FIG. 16D. Also, the most significant bit A3 is the bit for indicating whether or not it is scrambled by the EDPSS system, and it is decided with the following equation by the mode selector of FIG. 20.

A3=NOT (B2 OR B1 OR D4 OR NOT (D2))

Also, the lower 2 bits of the address ADDR of the table shown in FIG. 21 indicate either one of the 0th, 44th, 88th, or 780th clock in the respective scramble modes. These lower 2 bits are A1, A0 which are outputted at the 0th, 44th, 88th, 780th clock from the address counter control circuit 27 same as that of the DPSS above-mentioned.

The part A of the video signal which has been deleted by the additional mode (FIGS. 16A to 16D) in the EDPSS system is regenerated by utilizing the data of 2 H lines before whose color burst is in the same phase with the color burst signal of the above part A. That is, when the received signal is alternately written every 1 H line by using two line memories, the video signal 2 H lines before whose color burst is in the same phase remains in each line memory.

Then, as shown in FIGS. 22A to 22C, when the received video signal shown in FIG. 22A is written to the line memory, the part A' including A1', A2', A3' and A4' is neglected without writing to the line memory, and only the part B is written from the address 130 as shown in FIG. 22 B. When it is done like this, data of the part A of the video signal 2 H lines before is remained in the address 0 to 129 of the line memory as it is. Therefore, when reading out from the line memory is conducted from address 0 in order, the normal video signal for the color burst phase is regenerated as shown in FIG. 22C.

In order to realize this, it is required to settle a condition in which a horizontal synchronizing signal of the H line which is 2 H lines before the presently processed H line whose horizontal synchronizing signal is to be deleted should not be deleted. The mode selector of FIG. 20 and FIG. 25 described later is composed such that A3 of the line which is 2 H lines before is set to the "L"

level in order that A3 of the present H line is set to the "H" level.

Figure 24:
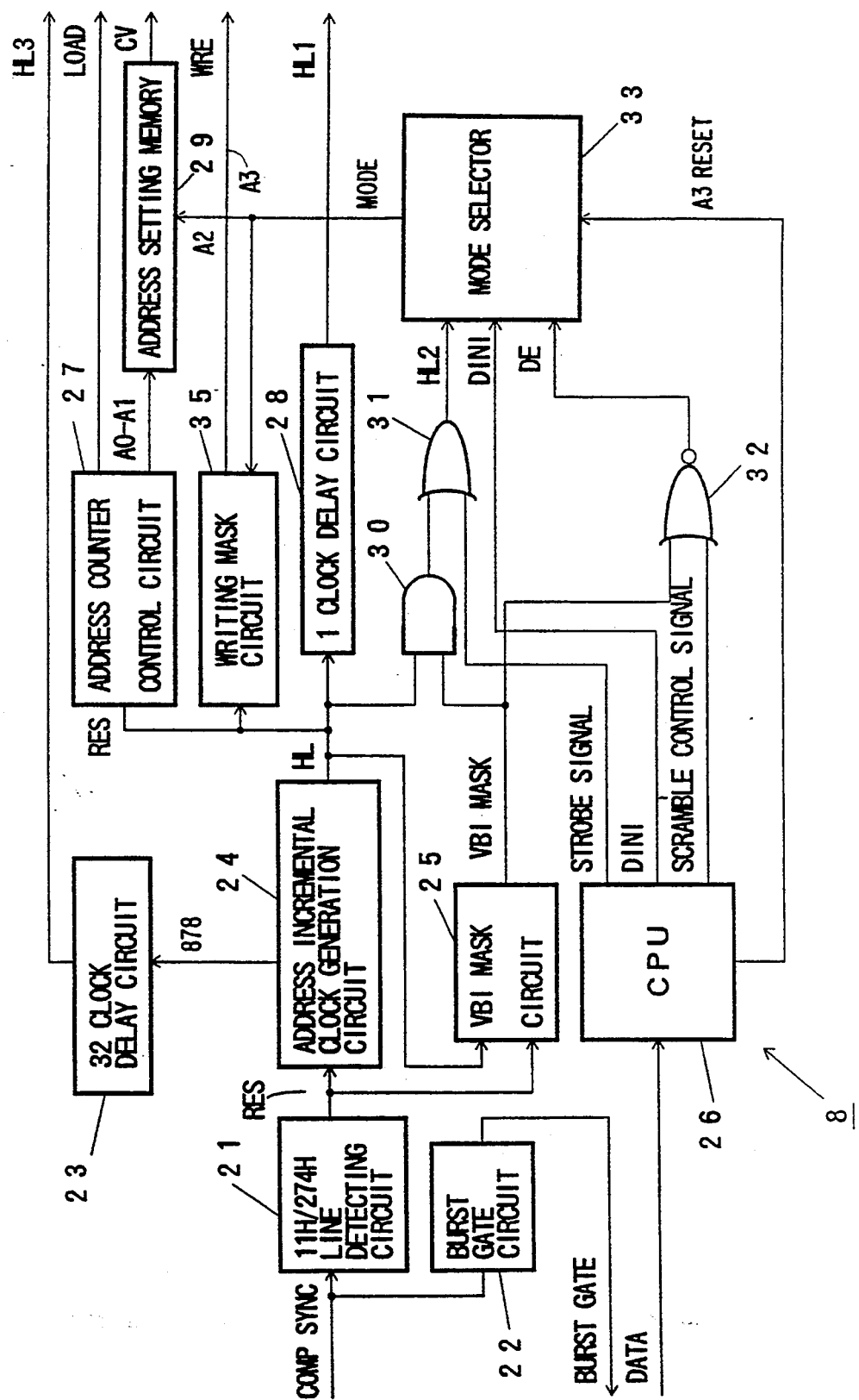
FIG. 24 is a schematic diagram indicating a concrete example of the timing circuit included in FIG. 23.
Figure 25:
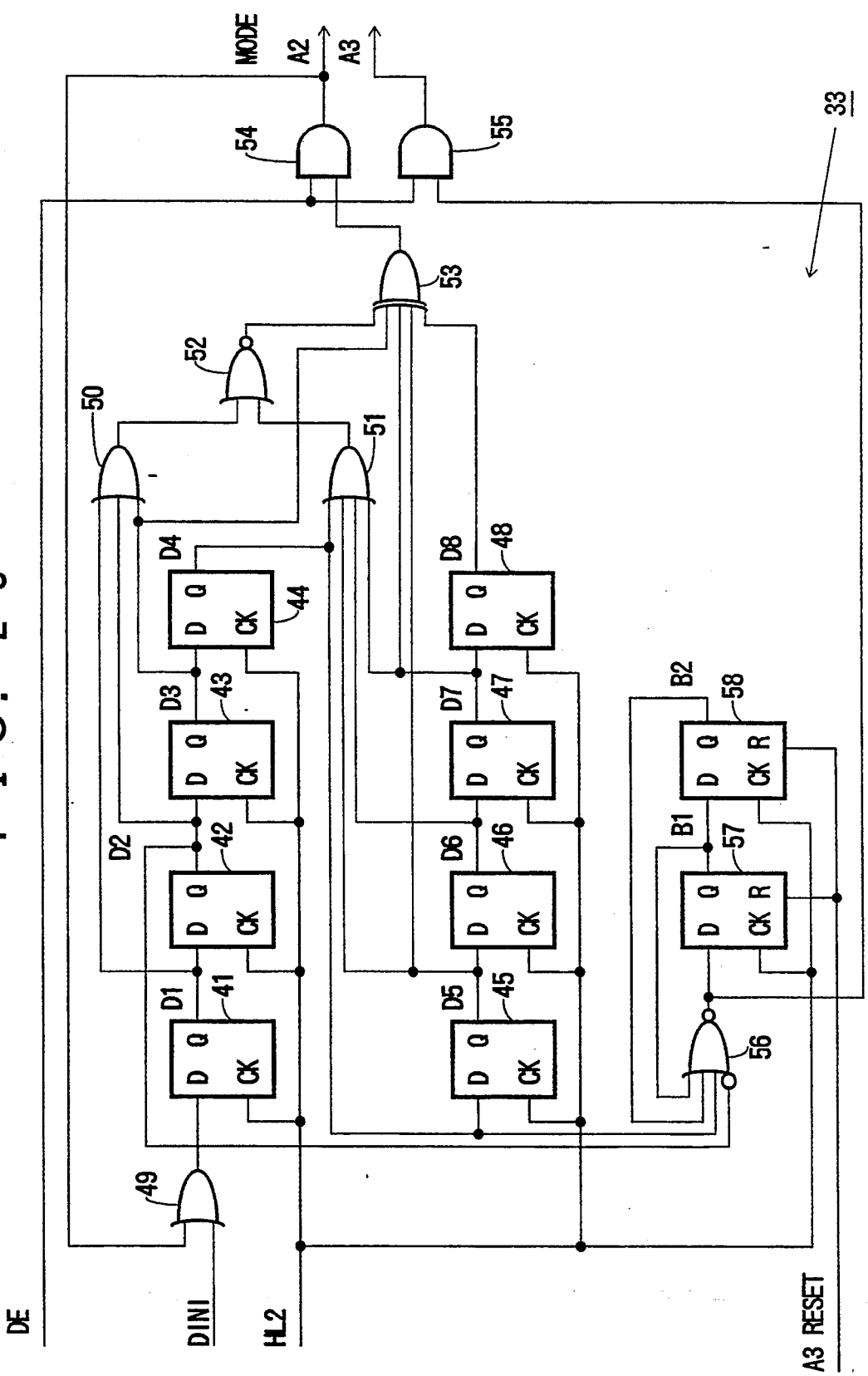
FIG. 25 is a schematic diagram indicating a concrete example of the mode selector included in FIG. 24.

An embodiment of the video descramble equipment (decoder) composed by applying the EDPSS system of the present invention is shown in FIGS. 23 to 25, wherein FIG. 23 indicates the entire composition of the video descramble equipment, FIG. 24 indicates a composition of the timing circuit 8, FIG. 25 indicates a composition of the mode selector 33. It is to be noted that since the basic circuit composition of the descramble equipment is respectively almost same as that shown in FIG. 18, FIG. 19 and FIG. 20, same symbols are used for these same part.

The mode selector 33 shown in FIG. 25 has same pseudo random number generator as that of the scramble equipment of the transmitting side, and decides the scramble mode. When the scramble mode is MODE 10 or MODE 11, writing clock WRCK inputted to the line memory circuit 4 of FIG. 23 is masked by the writing mask circuit 35 of FIG. 24, and thereby as the part A' of FIG. 22 is not written to the line memory, the color burst signal of the part A' of the H line which is 2 H lines before is remained in the line memory as it is.

Also, the address data to be loaded to the writing address counter 9 at the 0th, 44th, 88th and the 780th clock in each H line is stored in the address setting memory 29 of FIG. 24 as the table. This address table is shown in FIG. 26, the usage of which is the same as that of FIG. 21 mentioned above. And, the symbol of "***" in FIG. 26 indicates that any value is permissible, since the writing clock WRCK is masked and writing to the line memory is not conducted during this interval.

In an embodiment of the EDPSS mentioned above, although the time shift modes in the additional mode are referred to as only two kinds; the MODE 10 and the MODE11 as shown in FIG. 16, this time shift mode may be selected optionally within the interval of part A. Therefore, it is possible for this time shift mode to increase such a number as four kinds or even eight kinds.

Also, in either embodiment of the DPSS or the EDPSS, the random number generator is used as the mode selector, but instead of this method, the following method may be used. That is, a scramble mode is previously set for each H line within 1 frame, the scramble mode of each H line is stored in a memory element such as the memory as the table, and contents of this table is multiplexed on a video signal.

Next, the third scramble system according to the present invention will be described.

Figure 27A:
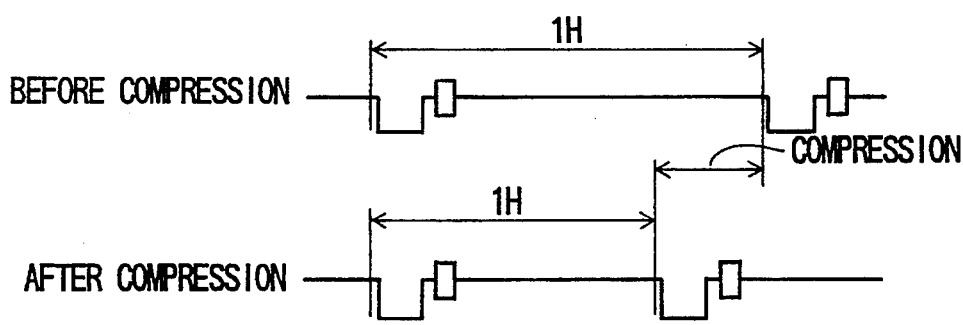
FIGS. 27A and 27B illustrate a theoretical explanation diagram of a third video scramble system according to the present invention, wherein FIG. 27A indicates a compressing operation of a pedestal part, and FIG. 27B indicates an expanding operation thereof.
Figure 27B:
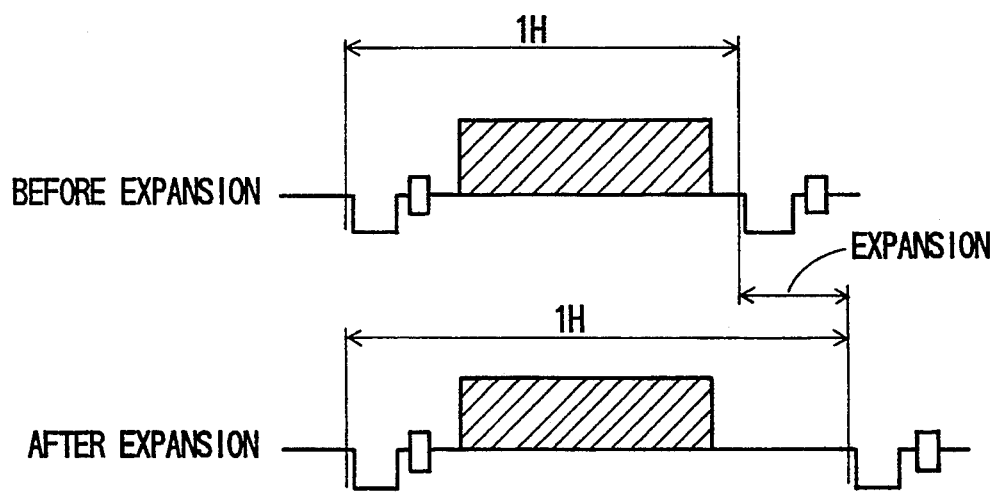

The theoretical explanation diagram of the third scramble system of the present invention is shown in FIG. 27. VBI(vertical blanking interval) comprising 21 H lines having no video signal exists at the head part of each field in the television signal of the NTSC system (refer to FIG. 2). Then, the third scramble system of the present invention is such a system that while one part of pedestal is deleted in the specified H line in this VBI and the signal interval of this H line is compressed as shown in FIG. 27A, the time interval corresponding to the thus deleted compressed pedestal part is expanded in other appropriate H line within the same field as shown in FIG. 27B.

Thus, if a time compression of a H line and a time expansion of another H line are conducted within 1 field, maintaining 1/60 second conforming to the NTSC system with respect to a period of entire 1 field, such a scramble can be performed as that the position of the horizontal synchronizing signal with respect to each of the H lines is disturbed in timing within 1 field. That is, in the case that the scramble is not correctly decoded by a non-subscriber, a deviation of a synchronizing signal caused by follow-up characteristics of a synchronizing detection circuit of a television set which is connected to an output of a descramble equipment (decoder) continues so far as several tens H lines, whereby a scramble mode in which a horizontal scanning is disturbed at any position on a television screen is operated. And, in the case that the scramble is correctly decoded by a qualified subscriber, a descramble (decode) mode is processed inversely with the scramble mode. That is, the H line compressed in a scramble system may be expanded in time series, and the H line expanded in the scramble system may be compressed.

Figure 28:
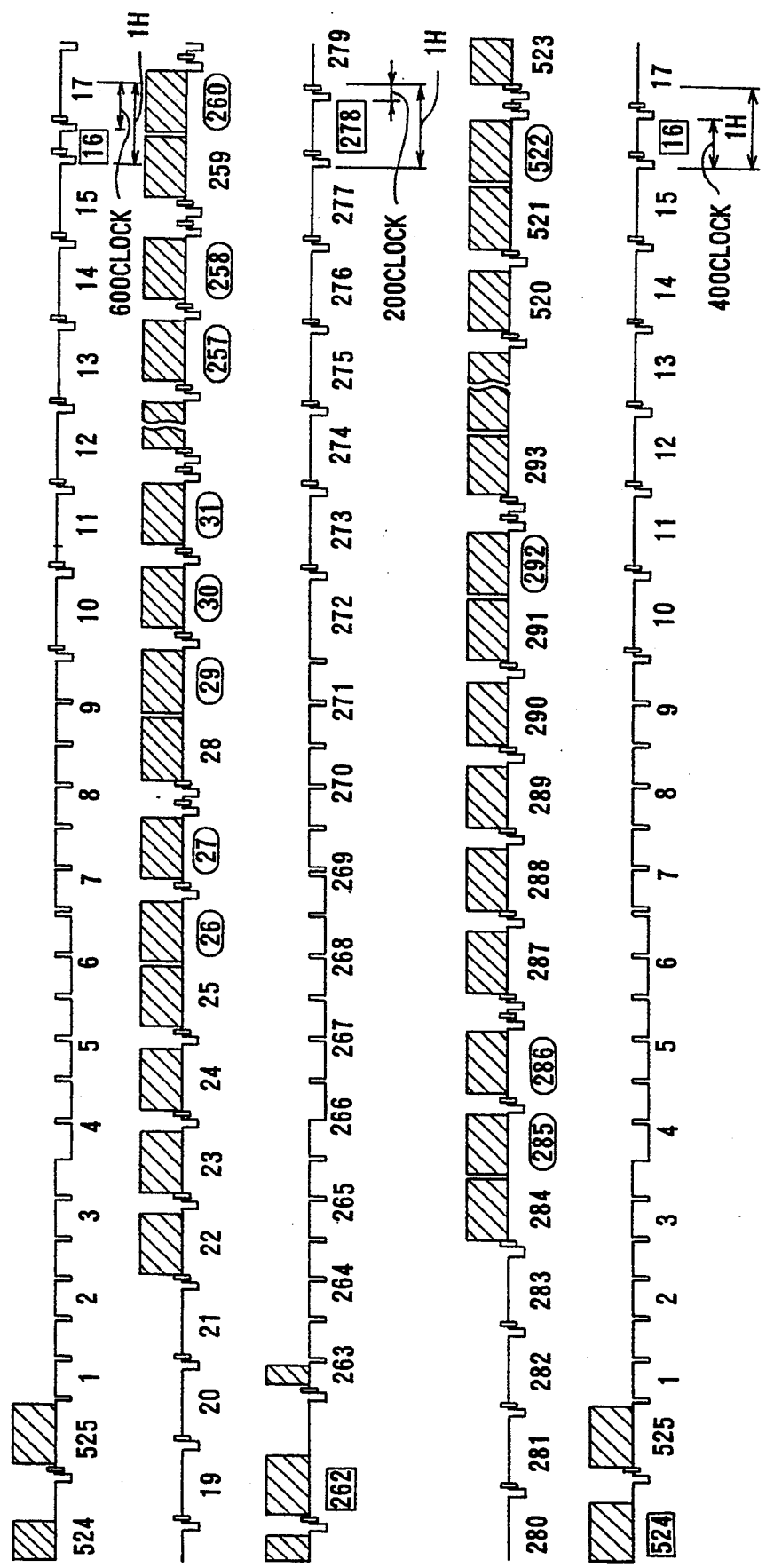
FIG. 28 is a waveform chart showing a video signal of one frame, when scrambled by using combination of the first video scramble system and the third video scramble system.

A waveform example scrambled by using the third scramble system of the present invention is shown in FIG. 28. In the first field, the pedestal part is compressed so far as 600 clocks in time series in the line 16H, and the pedestal part is expanded so far as 600 clocks in time series in the line 262H. Also, in the second field, the pedestal part is compressed so far as 200 clocks in time series in the line 278H, and the pedestal part is expanded so far as 600 clocks in time series in the line 524H.

The third scramble system of the present invention can be used independently, although the more reliable scramble system can be obtained by combining with the DPSS system mentioned above. A waveform of FIG. 28 is a process example in which the third scramble system and the DPSS system is combined, the H line enclosed with a circle indicates the line scrambled by the DPSS system, and the H line enclosed with a square indicates the line scrambled by the third scramble system.

Figure 29:
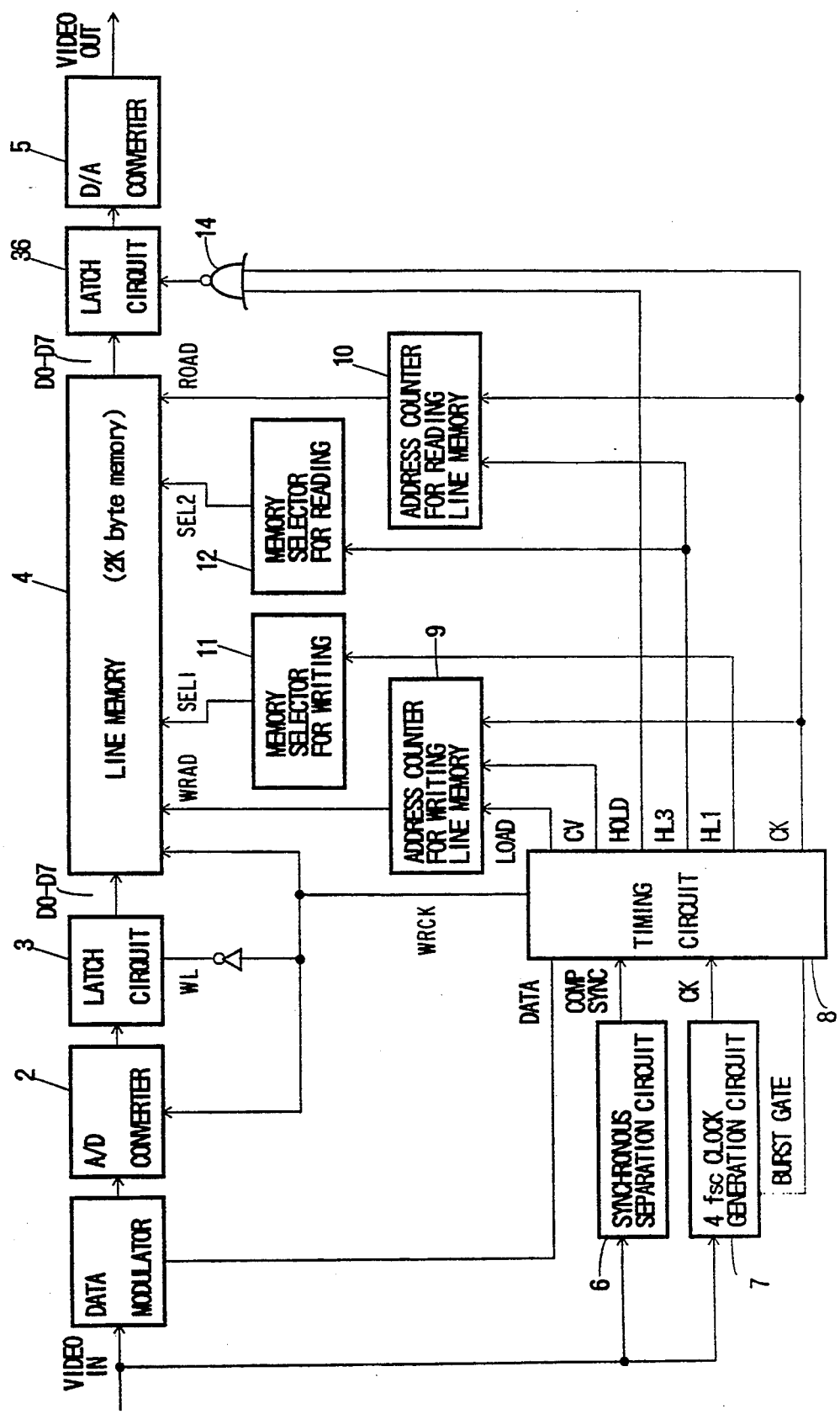
FIG. 29 is a schematic diagram indicating one practical example of a video scramble equipment for the scramble system shown in FIG. 28.
Figure 30:
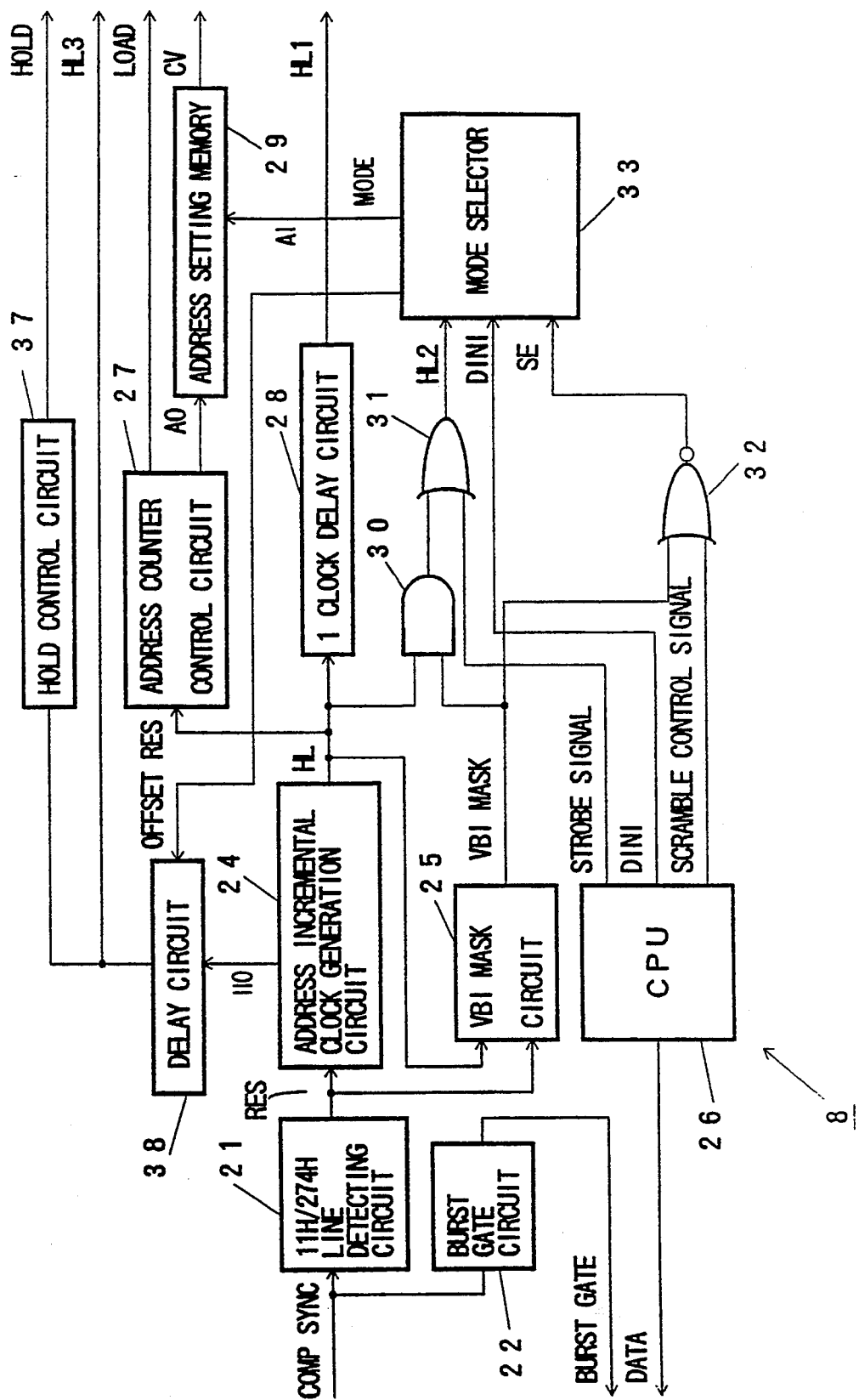
FIG. 30 is a schematic diagram indicating a concrete example of the timing circuit included in FIG. 29.
Figure 31:
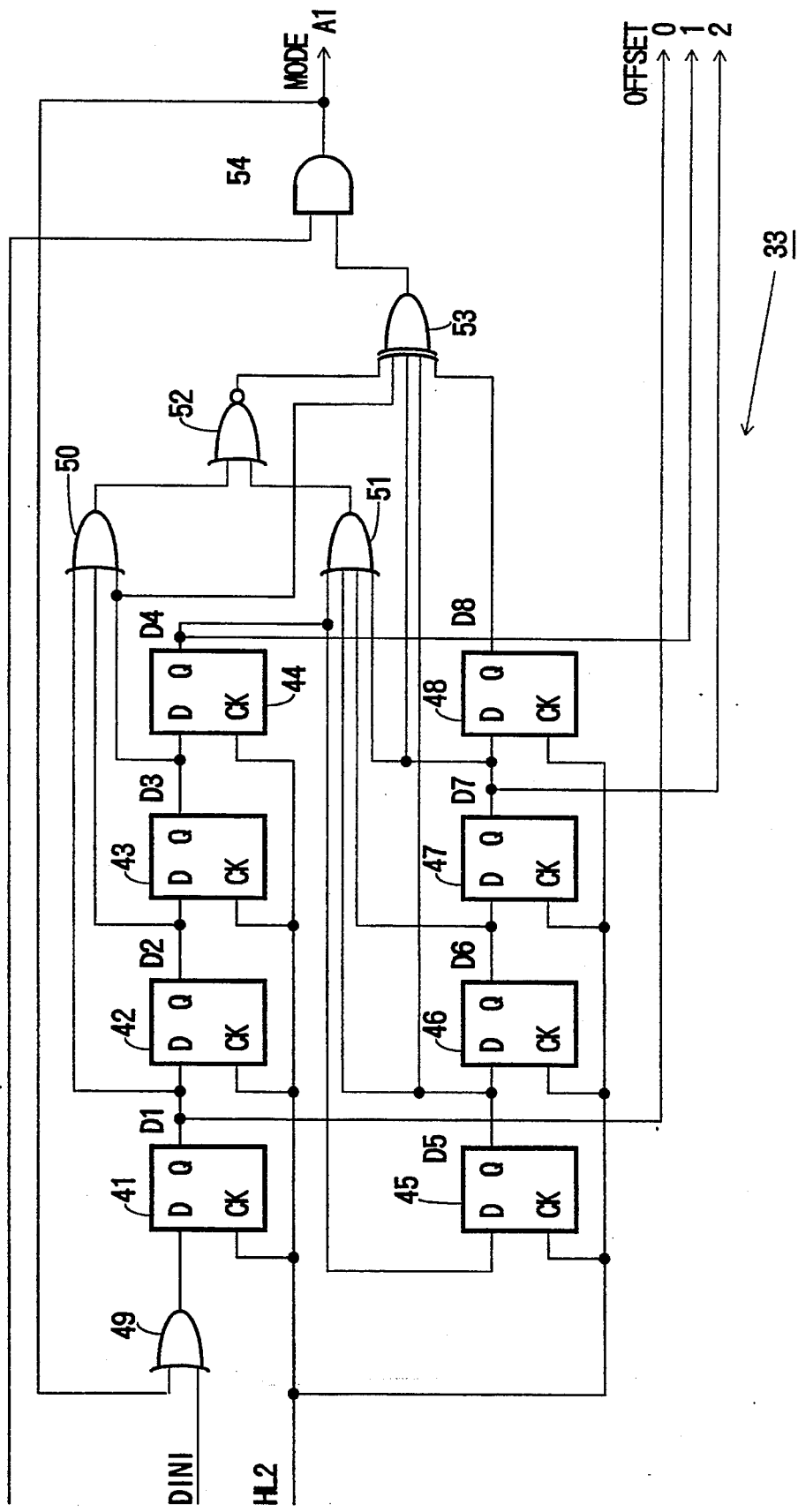
FIG. 31 is a schematic diagram indicating a concrete example of the mode selector included in FIG. 30.

An embodiment of the scramble equipment (encoder) composed by combining the third scramble system and the DPSS system in FIGS. 29 to 31. The circuits shown in these figures are basically of the almost same composition as that of the scramble equipment of the DPSS shown in FIG. 5, FIG. 6 and FIG. 8. Remarkably different points are such that the delay circuit 38 is provided and variable delay can be applied to a timing pulse HL3 for reading out the line memory by this delay circuit 38, whereby time compression and expansion of H line at desired position can be conducted. It is to be noted that same symbols are used for same parts as parts shown in FIG. 5, FIG. 6 and FIG. 8.

A change of a delay time of the timing pulse HL3 for reading out the line memory in the delay circuit 38 is conducted by the following method. That is, the time table as shown in FIG. 32 is previously stored in the delay circuit 38, and for example, when a video signal of the line 16H is read out from the line memory circuit 4, the offset signal OFFSET composed of 3 bits which is outputted from the mode selector 33 is provided to the delay circuit 38, and the delay time of the address position specified by OFFSET is provided to HL3.

That is, for example, a time compression process of 600 clock of the line 16H shown in FIG. 28 is briefly described as the following.

The offset signal OFFSET=110 of 3 bits taken out from the registers 41, 44 and 47 in the mode selector 33 (FIG. 31) at the line 16H position is provided to the delay circuit 38. This delay circuit 38 accesses the table shown in FIG. 32 by using this offset signal OFFSET=110 as address, and reads out the delay time 200 clocks at the address (110) position.

And, the delay circuit 38 outputs the timing pulse HL3 for reading out the line 16H referring to the H line pulse HL which is generated by the address incremental clock generation circuit 24 as the reference position at the point where the 200 clocks have passed. Therefore, since the video signal of the line 16H which is written in the line memory in the line memory circuit 4 is ended to read out at the 310th (200+110) clock point of the H line composed of 910 clocks, only the remained data of 310 clocks is read out up to 910 clocks. Consequently, the video signal of the line 16H loses 600 clocks of the latter half, so that time compression is conducted so far as lost clocks.

Figure 33:
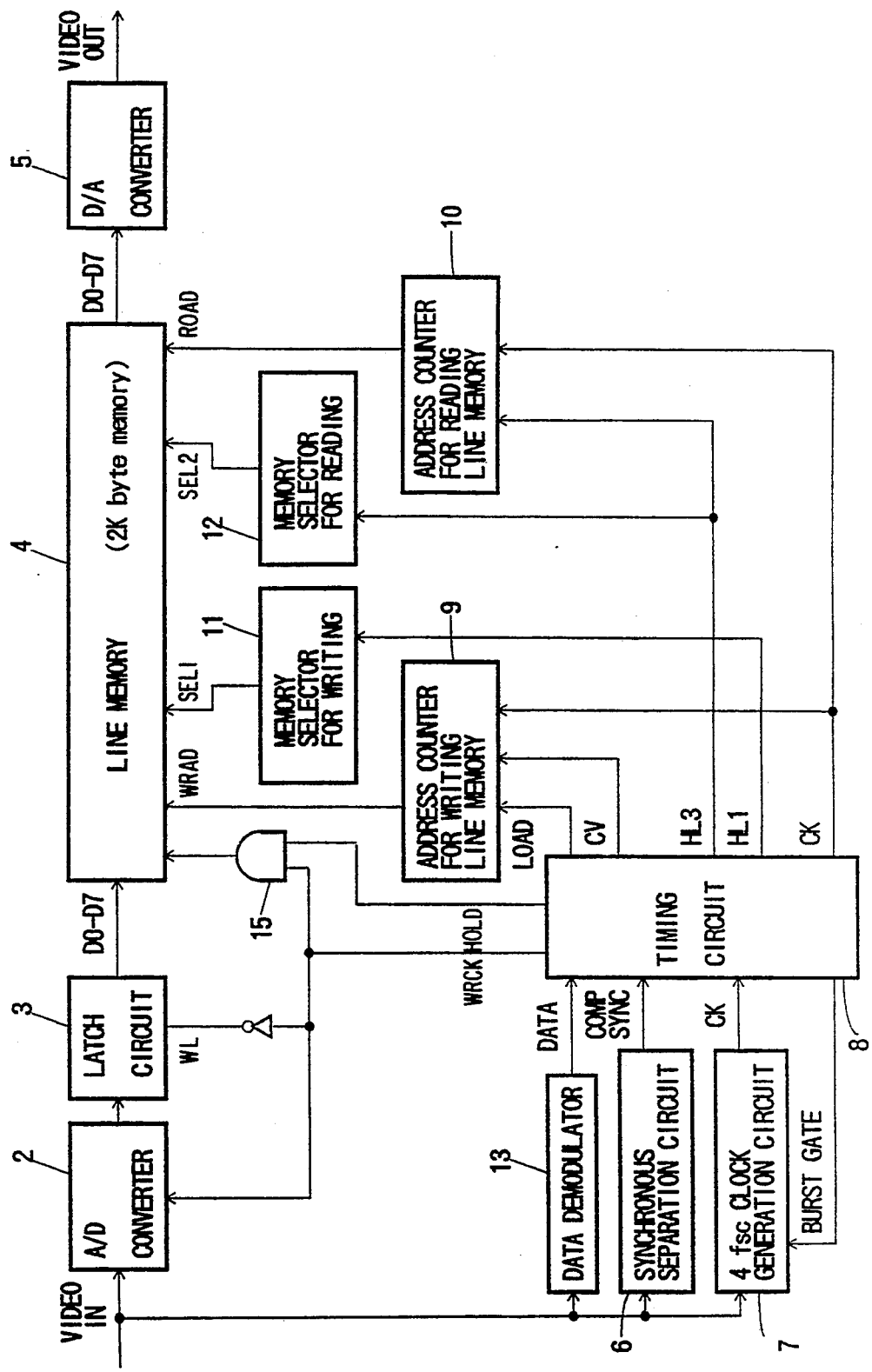
FIG. 33 is a schematic diagram indicating one practical example of a video descramble equipment for the scramble system shown in FIG. 28.
Figure 34:
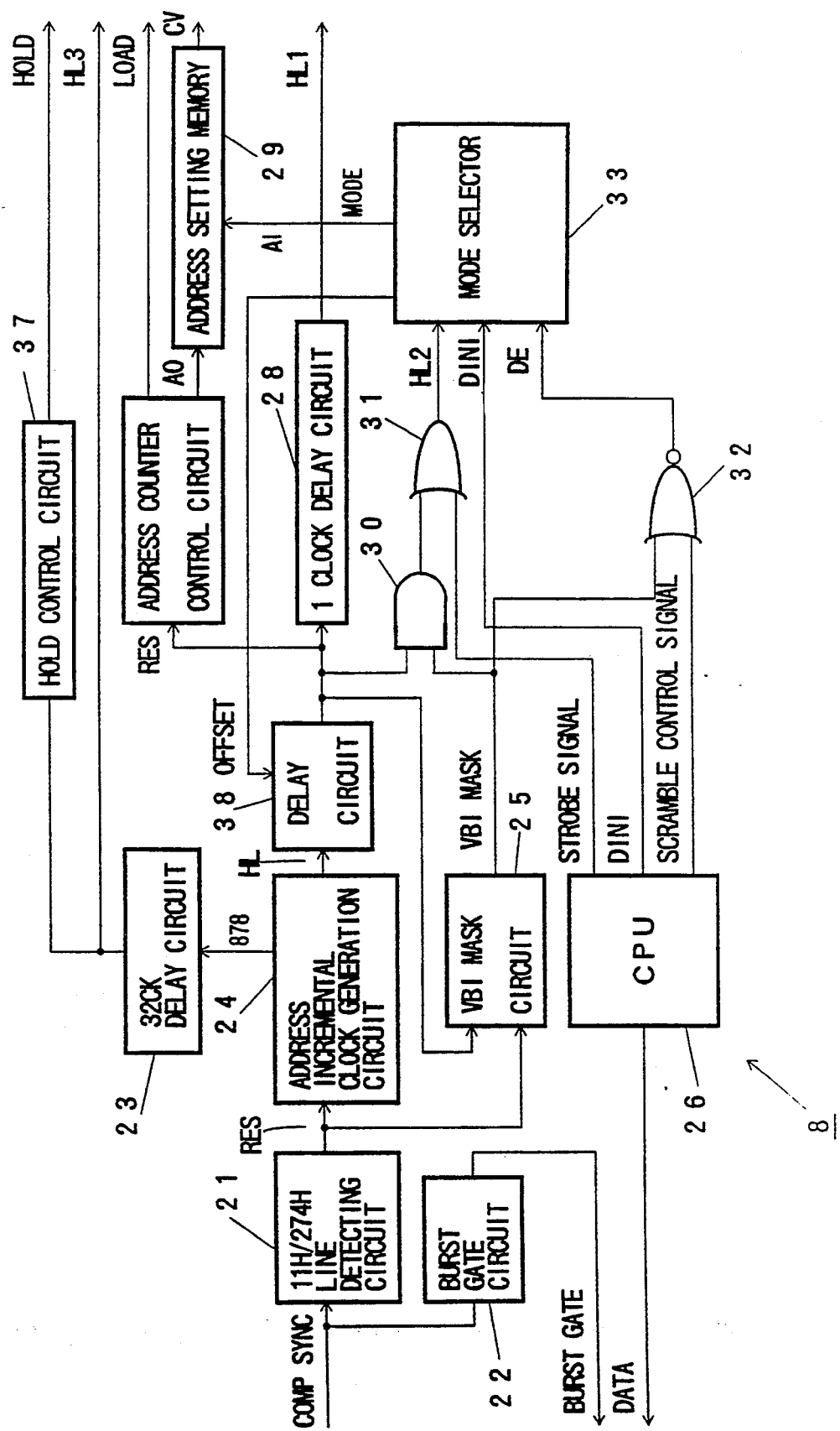
FIG. 34 is a schematic diagram indicating a concrete example of the timing circuit included in FIG. 33.
Figure 35:
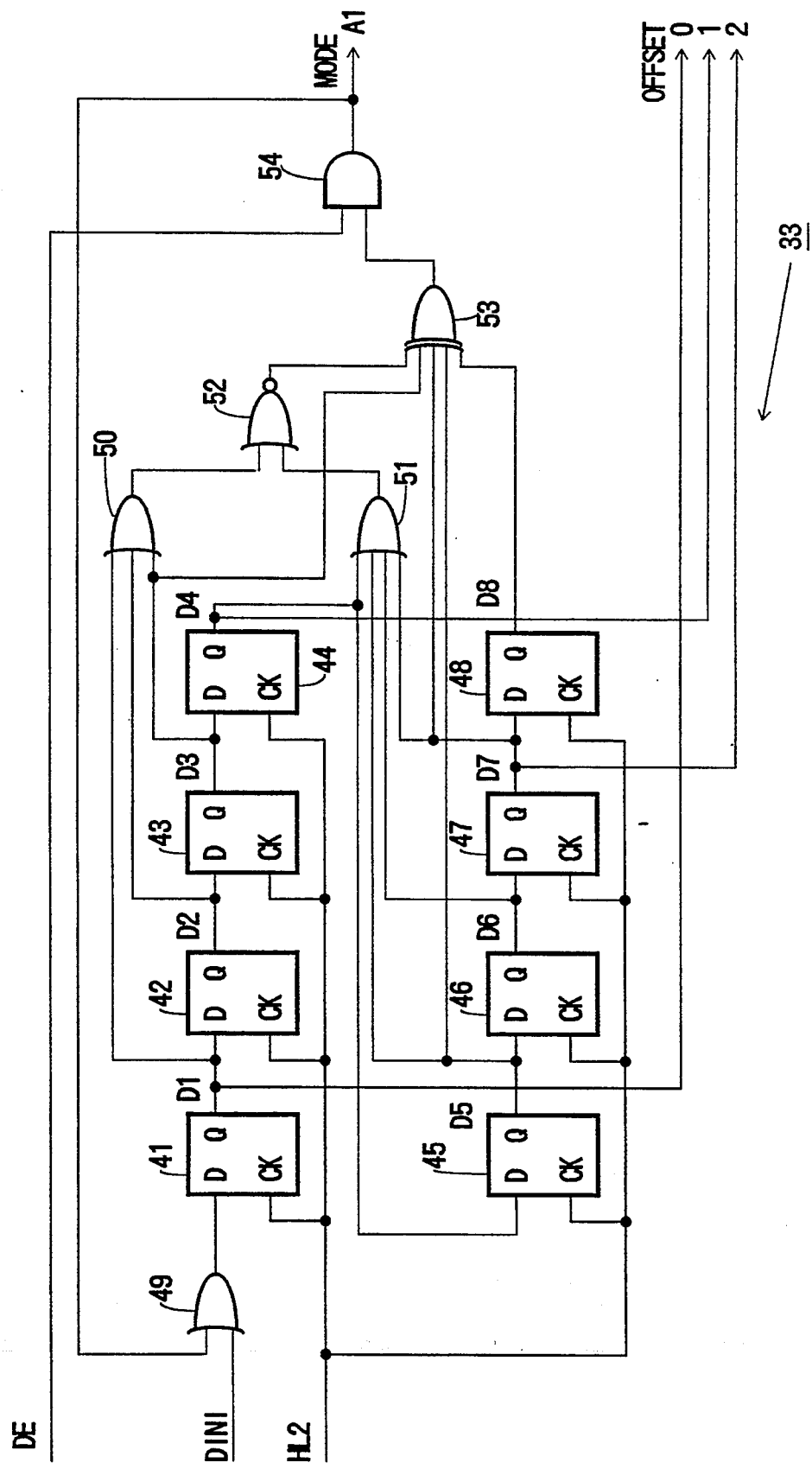
FIG. 35 is a schematic diagram indicating a concrete example of the mode selector included in FIG. 34.

An embodiment of the descramble equipment (decoder) which makes a pair of the scramble equipment is shown in FIGS. 33 to 35. The circuits disclosed in these figures are of the same composition as the scramble equipment of FIGS. 29 to 31, and same symbols are used for same parts.

Figure 36:
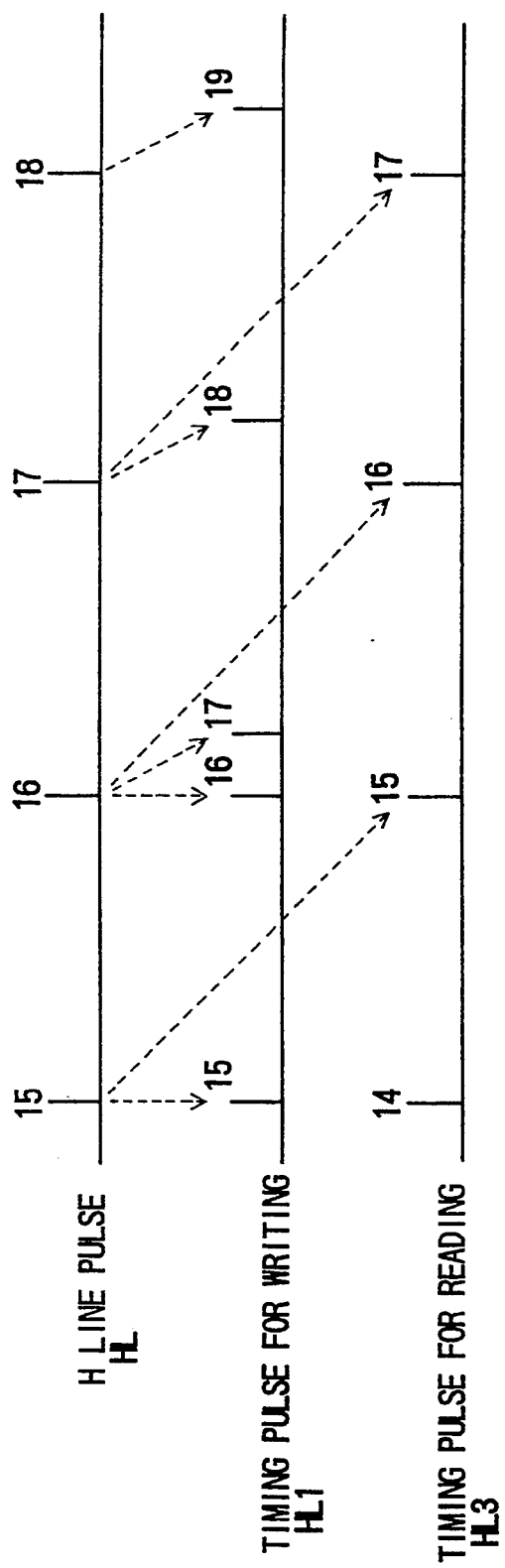
FIG. 36 is a time chart showing timing pulses for writing to and reading from the line memory during the scrambling operation.

Descramble is conducted as the following method. That is, when a video signal is written to the line memory circuit 4, the writing timing pulse HL1 is changed conforming to the offset signal OFFSET which is provided by the mode selector 33 in the delay circuit 38. Timing relation between the writing timing pulse HL 1 for the H line pulse HL outputted from the address incremental clock regeneration circuit 24 and the reading out timing pulse HL 3 is as shown in FIG. 36.

Figure 37:
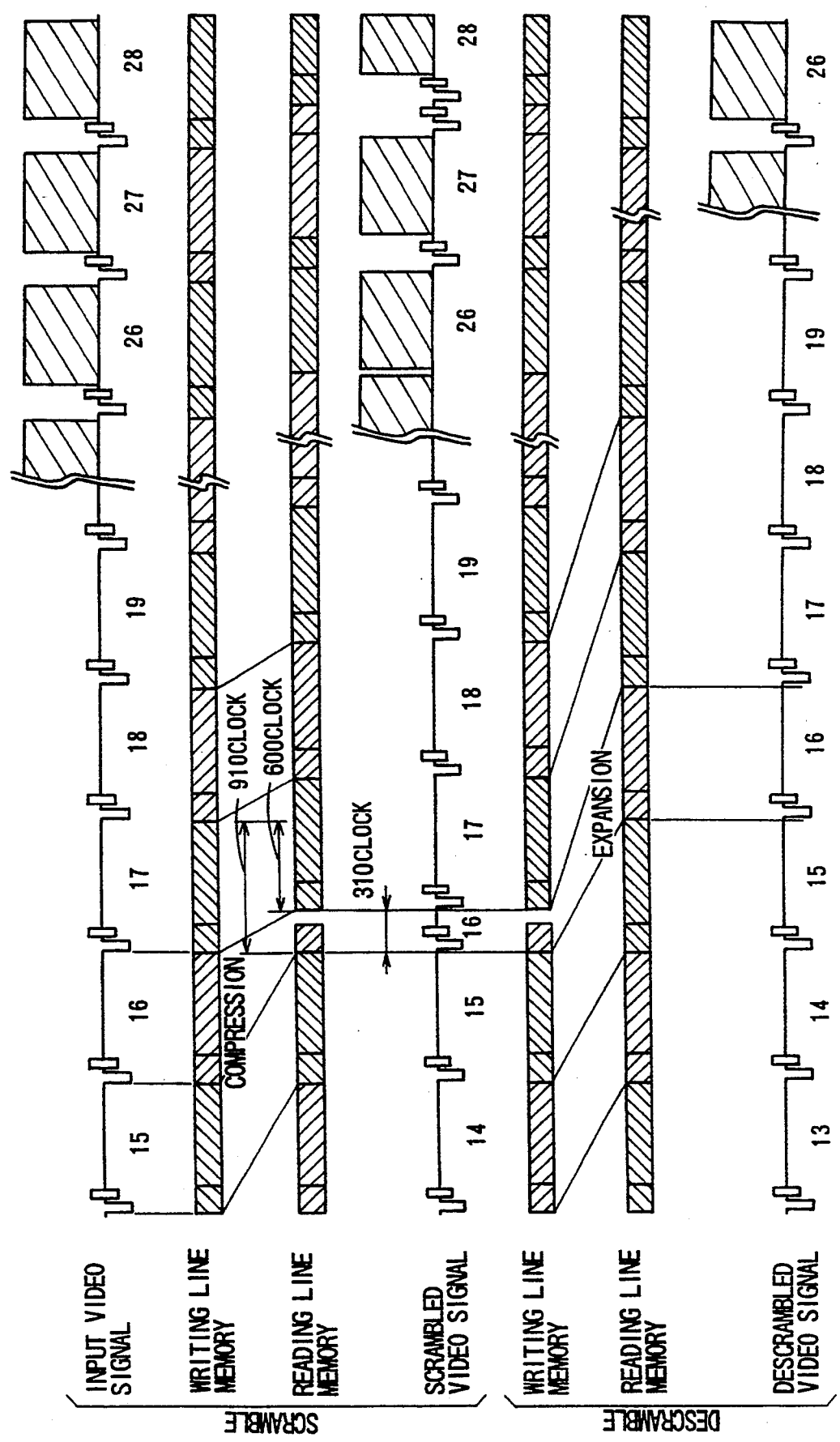
FIG. 37 is a processing explanation chart for time compression and expansion of the line 16H.
Figure 38:
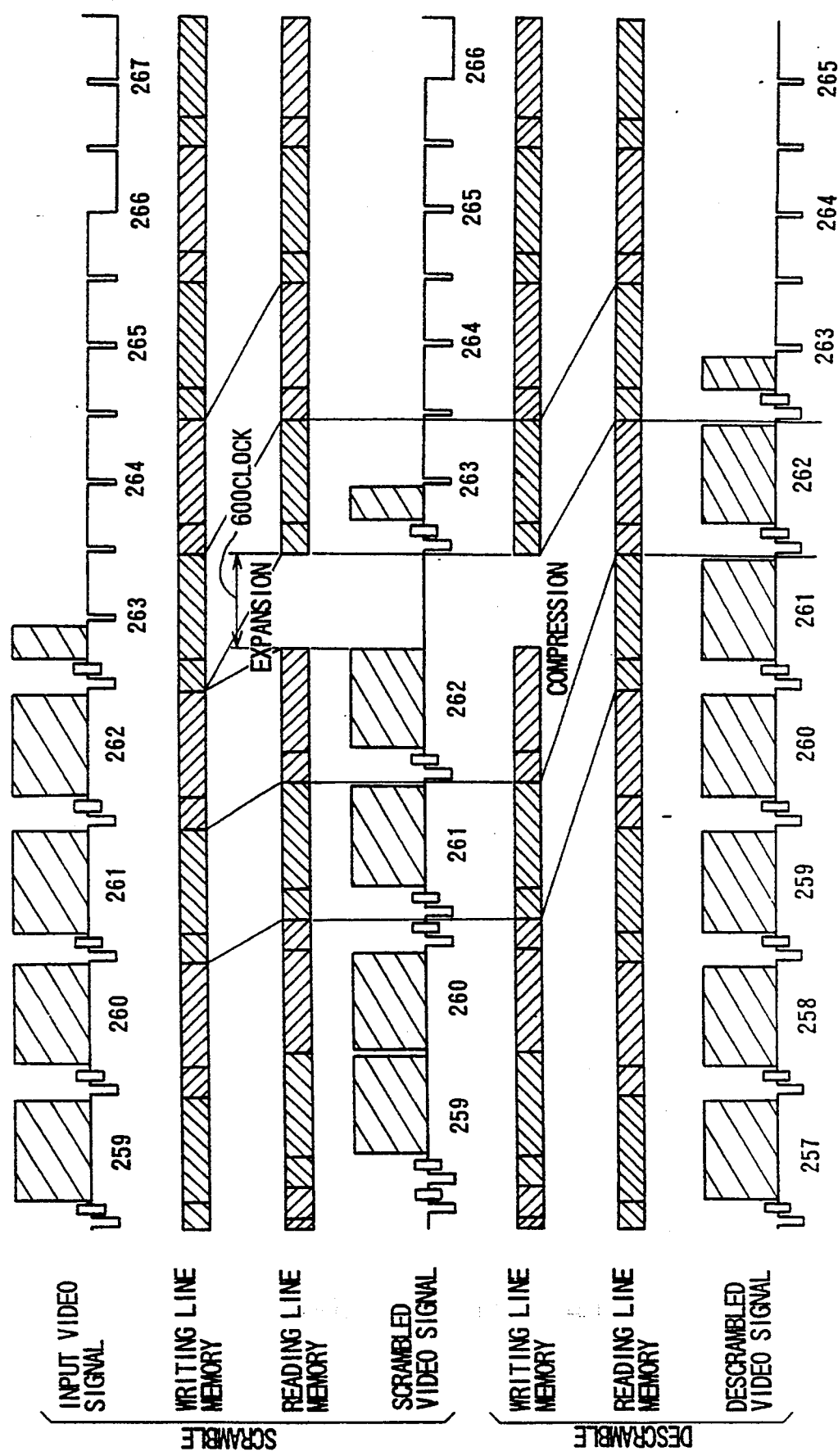
FIG. 38 is a processing explanation chart for time compression and expansion of the line 262H.

The address incremental clock generation circuit 24 is reset by the reset pulse RES outputted from the 11H/274H line detecting circuit 21 at the lines 11H and 274H respectively, and after it is synchronized with the input video signal, running freely, it outputs H line pulse HL. The delay circuit 38 comprises the clock counter and a comparator (not illustrated), and after outputting the writing timing pulse HL1 for the line 16H as shown in FIG. 36, its comparison value is changed, and the timing pulse HL1 for the line 17H is outputted after the specified offset time interval. The compression and expansion processing conditions in the line 16H part are shown in FIG. 37, and the expansion and compression processing conditions in the line 262H part are shown in FIG. 38.

In the case of the third scramble system of the present invention, since the portions to be time-compressed in the line 16H and 278H specified within the VBI are all pedestal parts excluding the HBI part, there will be no harm caused to the picture quality by this time compressing operation. Further, when character multiplexed data is superimposed on each of these lines 16H and 278H, time compression may be conducted in another H line within the VBI. Also, since the portions to be time-shifted in the lines 262H and 534H are the pedestal parts situated at the rear side of the video signal portions, time expansion does not cause any inferior effect to the video signal as a whole. Therefore, in the case of the third scramble system of the present invention, it can be said that deterioration of picture quality is never caused by the scramble and descramble operations as is not caused in the above mentioned first and second scramble system. Especially, the H line to be time-expanded in the scrambling operation, though it may be the H line within the effective picture, can be specified at random by using a random signal etc. every field as shown in FIG. 39.

Figure 39:
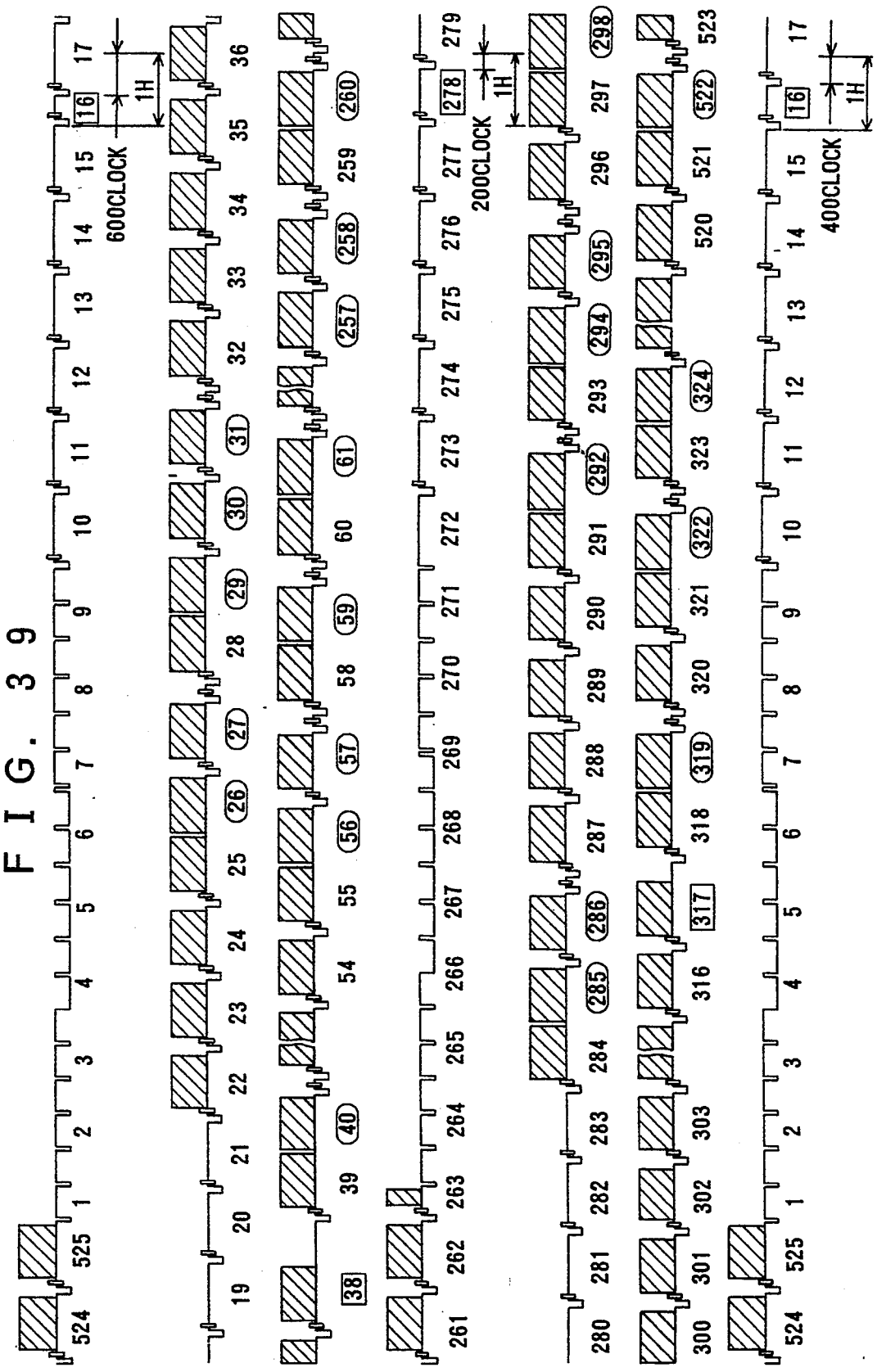
FIG. 39 is a chart indicating an example of a waveform of one frame of a video signal, when the scramble positions in the third video scramble system are randomly specified in FIG. 28.
Figure 40:
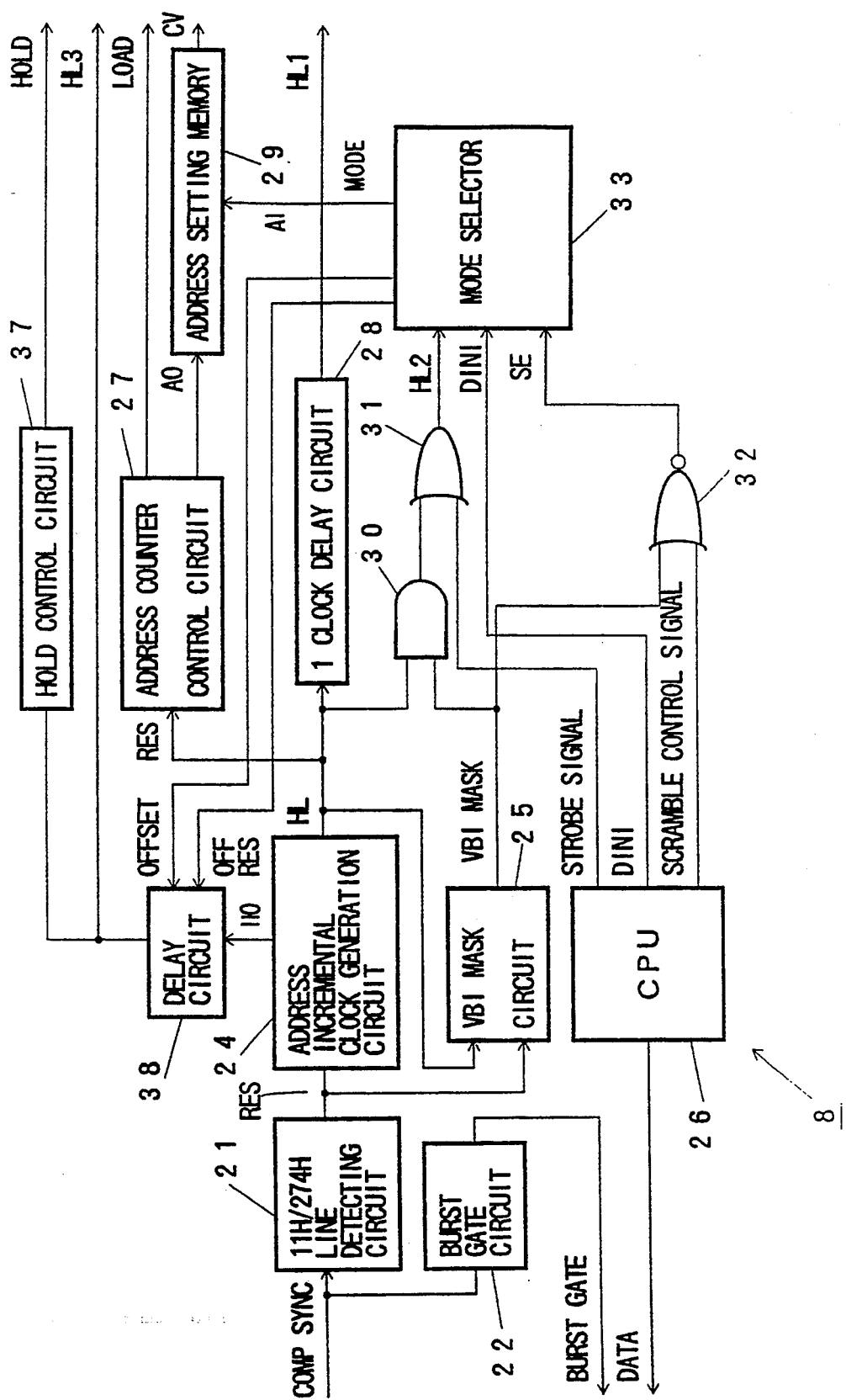
FIG. 40 is a schematic diagram indicating a concrete example of the timing circuit used for the video scramble equipment for realizing the scrambling operation shown in FIG. 39.
Figure 41:
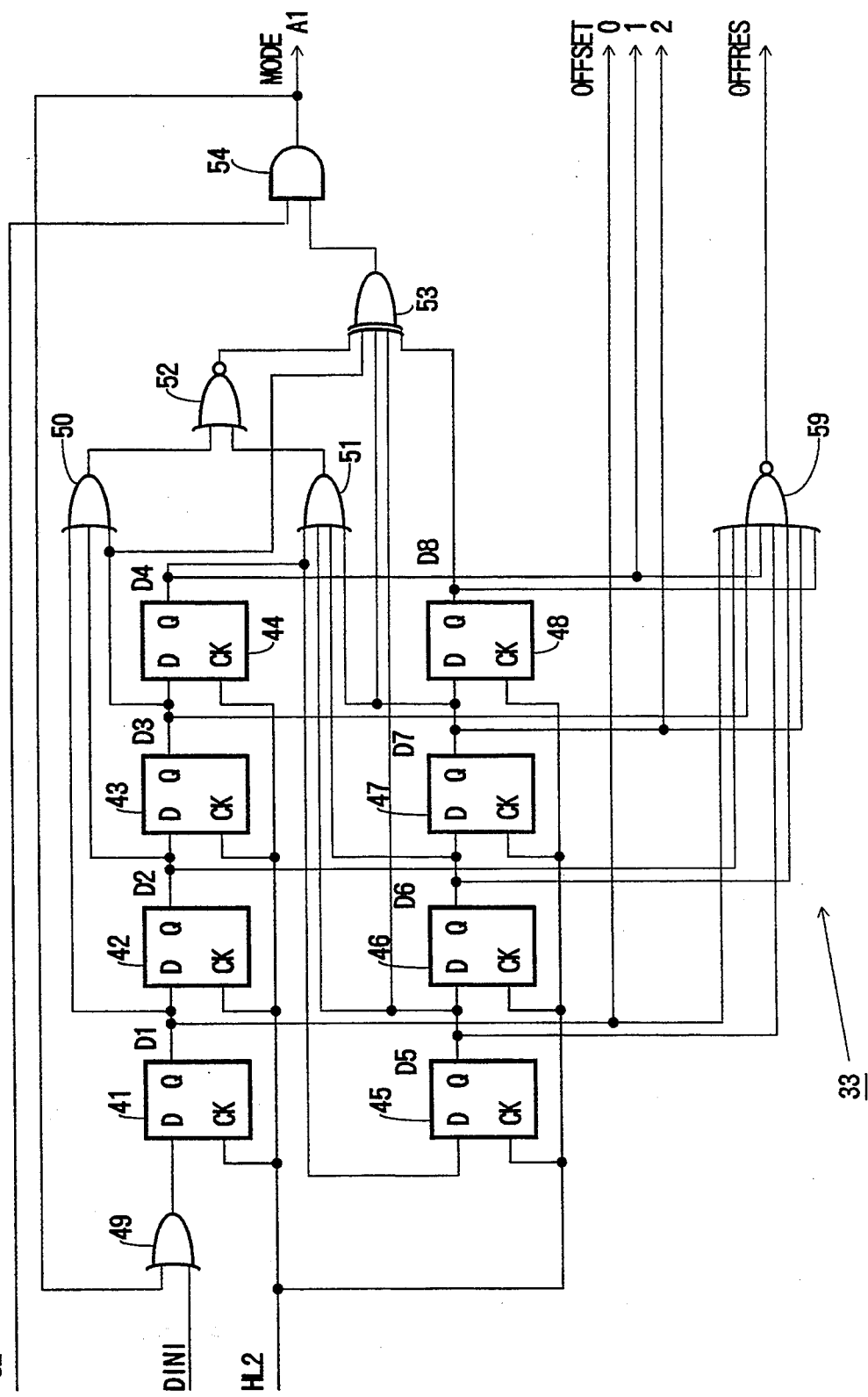
FIG. 41 is a schematic diagram indicating a concrete example of the mode selector included in FIG. 40.
Figure 42:
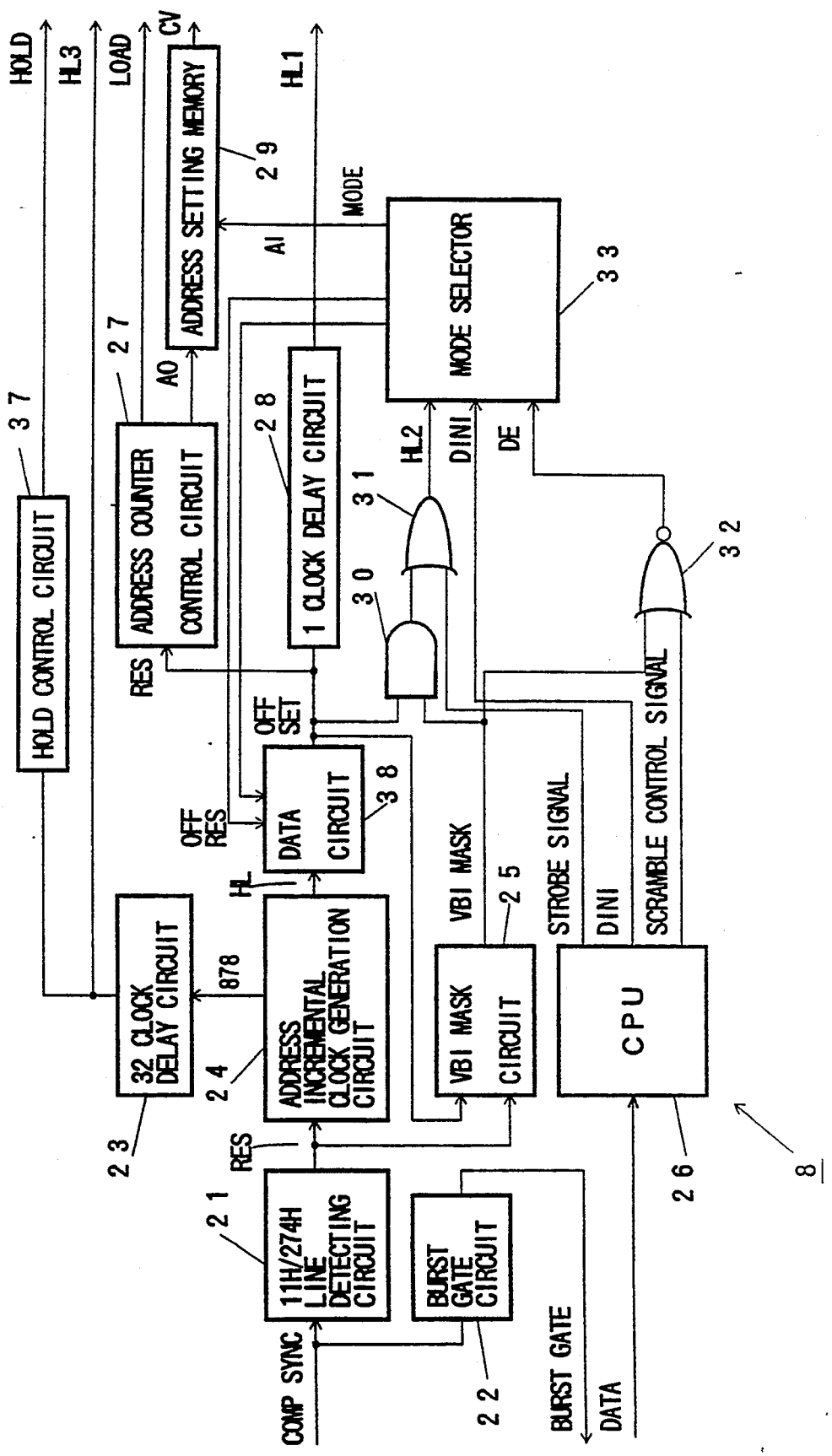
FIG. 42 is a schematic diagram indicating a concrete example of the timing circuit used for the video descramble equipment for realizing the descrambling operation for descrambling the scrambled signals shown in FIG. 39.
Figure 43:
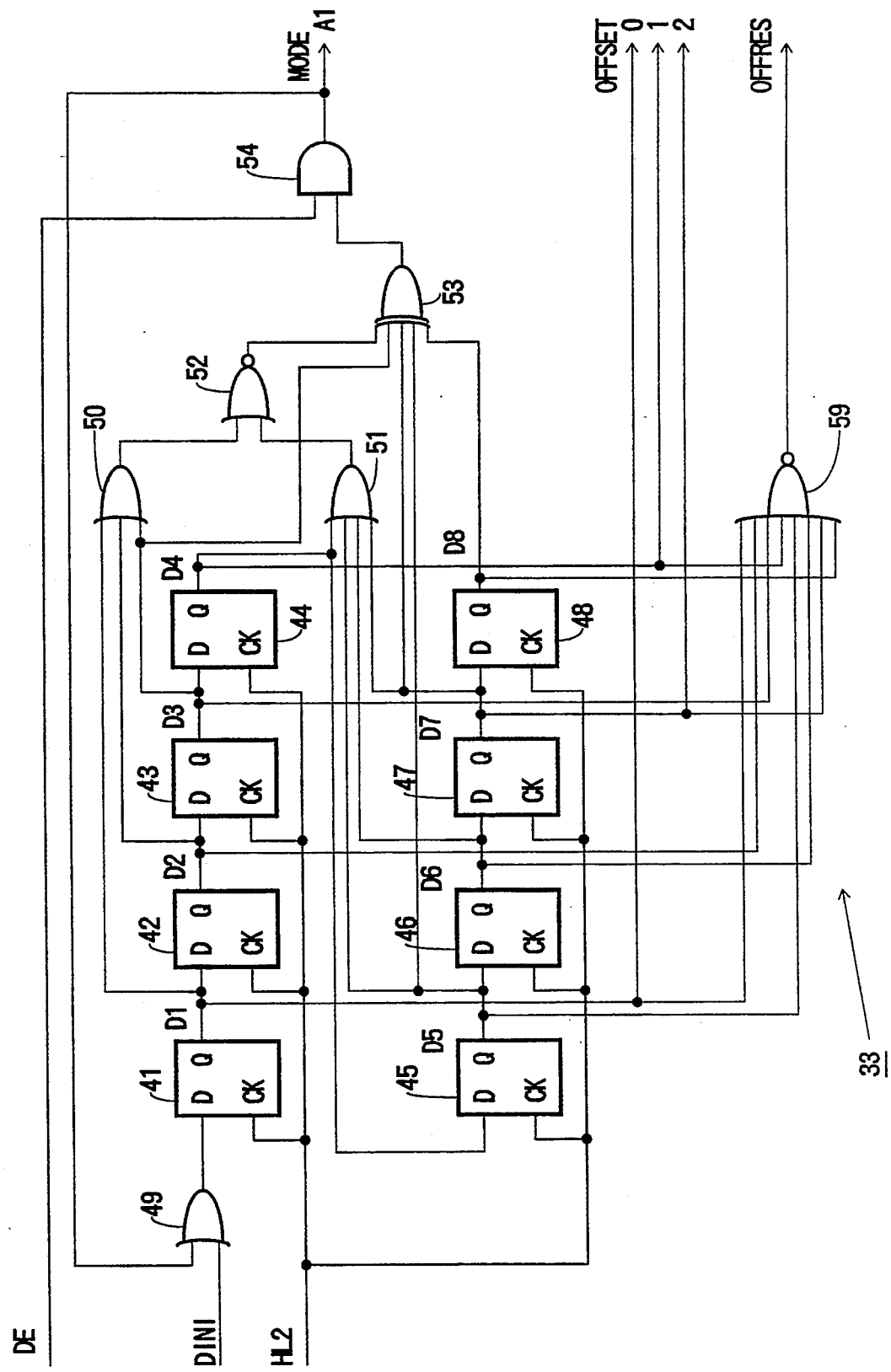
FIG. 43 is a schematic diagram indicating a concrete example of the mode selector included in FIG. 42.

A circuit example of the timing circuit 8 and the mode selector 3 for the scramble equipment which specifies randomly the H line to be time-expanded every field as FIG. 39 are shown in FIGS. 40 and 41. And a circuit example of the timing circuit 8 and the mode selector 33 for the descramble equipment which makes a pair with the above mentioned equipment are shown in FIGS. 42 and 43. In these circuit, data of 8 bits is taken out from the registers 41 to 48 of the mode selector 33 (FIG. 41, FIG. 43), sent to the EXNOR gate 59, and outputted therefrom as the offset reset signal OFFRES. Therefore, the offset value of the delay circuit 38 is reset in the H line in which 8 bits of the registers 41 to 48 are all "0".

In the above mentioned example, since 8 bits are used for generation of the offset reset signal OFFRES, reset is effective up to the line 255H. However, since numbers of H line to which H line pulse HL2 that is provided to the mode selector 33 as a shift lock is effective are 240 lines, there are occasions in which the reset signal can not cover up to the line 262H or up to line 524H. In this case, resetting may be accomplished at the line 262H and 524H.

As disclosed above, an example of combining with the DPSS system is shown as an embodiment of the third scramble system of the present invention. However, it is to be noted that if the MODE output A1 of the mode selector 33 is fixed to "0", the DPSS scramble system becomes ineffective, so that the scramble using only the third scramble system of the present invention can be effective.

Figure 44:
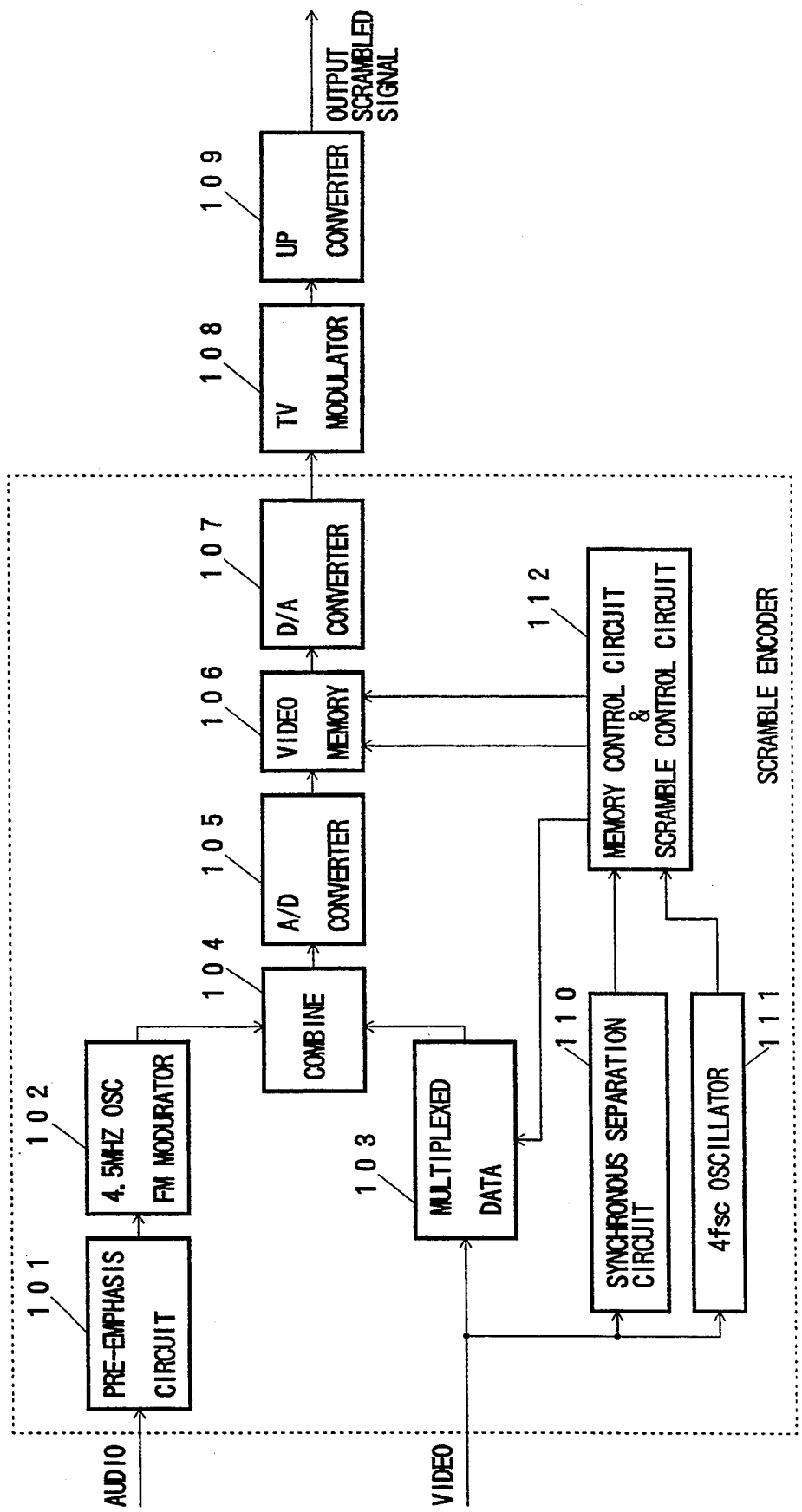
FIG. 44 is a schematic diagram showing an example of a scrambling equipment for scrambling an audio signal as well as a video signal.

By the way, although the scramble and descramble systems according to the present invention or the equipments utilizing these systems have been described heretofore, all of them are the systems by which only a video signal is scrambled. However, these systems are not always limited to a video signal, for example, a video signal and an audio signal can be scrambled as shown in FIG. 44. In this case, after an audio signal is pre-emphasized at 101, it previously modulates 4.5 MHz carrier in frequency at 102, and it is composed with a video signal at 104. Here, required data at 103 is multiplexed to the video signal at 103. A/D conversion is conducted in this composite signal at 105, it is scrambled by the DPSS mentioned before at the circuits 106, 110, 111 and 112, after the time-axis base processing D/A conversion is conducted at 107, also, this signal is converted to a specified channel signal at 108 and 109, and then sent to a subscriber. After the A/D conversion is conducted in a decoder of a subscriber, the scrambled signal is recovered to a normal position with respect to the time axis thereof by using a memory, and D/A conversion is conducted thereafter. It is to be noted that the circuits 101, 102 and 104 shown in the thick square frame in the figure among the above mentioned circuits are added for an audio signal scrambling operation, and the circuits 110 and 111 for scrambling a video signal correspond respectively to circuits 6, 7 of FIG. 5, whereas circuit 112 corresponds to an assembly of the circuits 8 to 12 of FIG. 5.

In this scramble system, since an audio signal as well as a video signal is also shifted with respect to the time axis thereof, scramble regarding a audio signal can also be effective to non-subscriber. That is, in the DPSS system or the like mentioned above, since a signal in the line memory is shifted, interference to a sound is a high-pitched sound interference, the merit of the sound is lost in a music program and a movie program, and the sound gives uncomfortable feeling to a subscriber.

Figure 45:
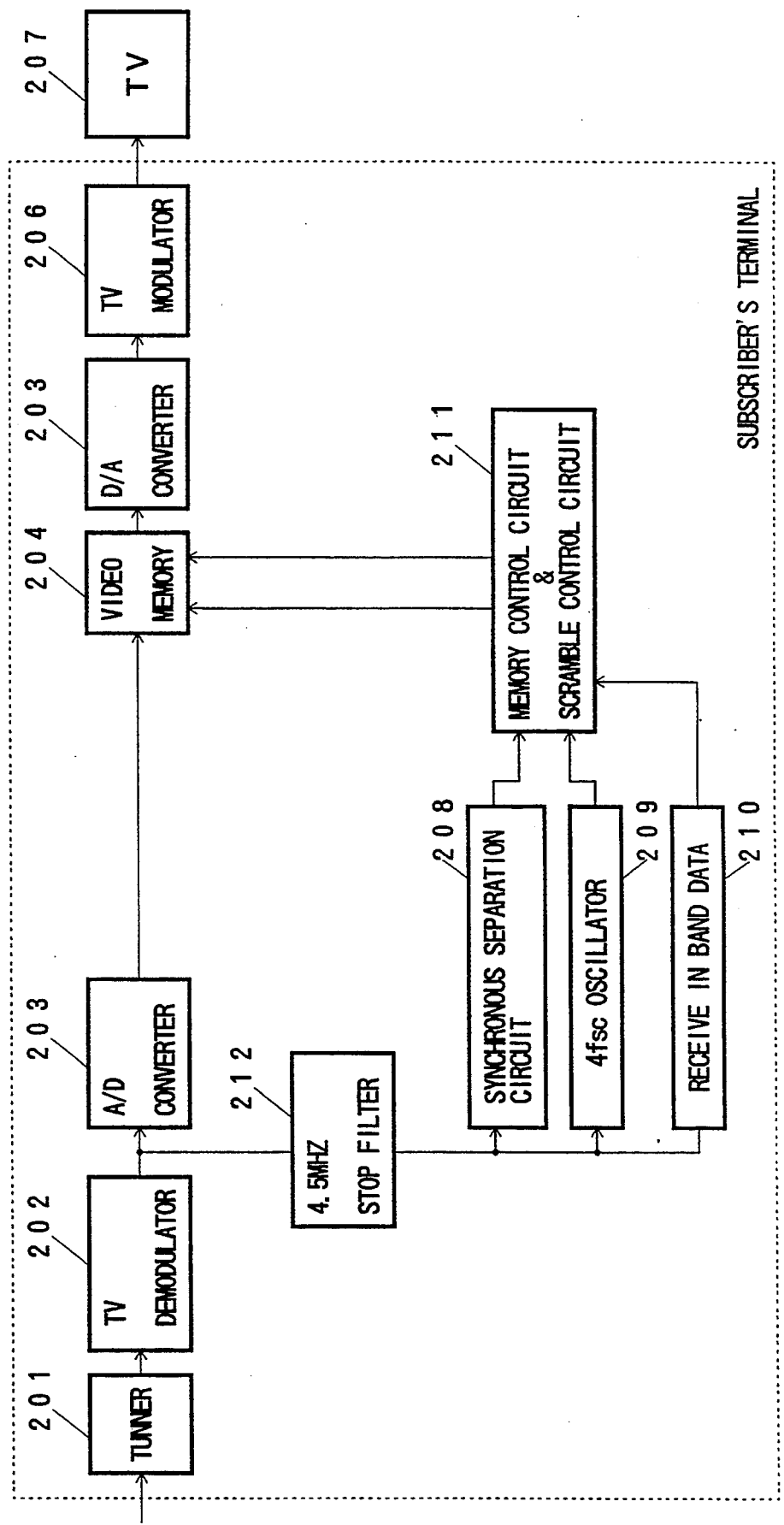
FIG. 45 is a schematic diagram showing an example of a descrambling equipment for descrambling an audio signal as well as a video signal.

There will be almost no bad influence caused by the quantum processing for the scramble system composed by the above method due to the fact that the audio signal is frequency modulated, whereby the only thing to be considered is a stabilization of chroma-lock characteristics of the oscillator 111 which oscillates frequency of 4 fsc which is four times as high as a color subcarrier used for sampling clocks. Thus, using this technology, upgrading from the video scramble technology presently used to the scramble system having the audio scramble system as well can be easily realized. A subscriber terminal (descramble system) used for the above scramble system is shown in FIG. 45. It is to be noted that a data receiver for control channel and a control equipment or the like used for controlling visual and sound effects etc. are omitted here because such devices are not important for explaining the above technology.

The descramble system against the above mentioned scramble system is as follows.

After the scrambled composite signal is received in the specified channel in the TUNER 201, and demodulated in 202, this demodulated composite signal is converted to a digital signal in 203 and then sent to 204. At the same time, the composite signal demodulated in 202 is sent to 212 where only the video signal is taken out, while a synchronizing signal in the video signal is taken out in 208, a signal of frequency 4 fsc which is four times as high as a color subcarrier is generated, and sent respectively to 211 afterwards. Also, in-band data superimposed in a vertical blanking interval of the video signal is extracted and sent to 211. Circuit 211 descrambles the composite signal by controlling writing the composite signal to 204 and reading out the composite signal from 204 in accordance with the synchronizing signal, 4 fsc signal and the in-band data. Thereafter, the composite signal read out from 204 and descrambled is converted to an analog signal in 205, and after modulated to TV signal in 206, sent to the TV receiver 207. By the way, the circuits 202, 208 and 209 for video scramble correspond respectively to circuits 13, 6, 7 of FIG. 9, and the circuit 211 corresponds to an assembly of circuits 8 to 12 of FIG. 9.

Thus, a decoder for descrambling the scrambled audio signal also can be realized with a relatively simple composition.

Also, even if the block to be shifted deviates by several blocks due to a deviation of synchronizing separation between the encoder and the decoder, as it corresponds to clock of 4 fsc=14.31818 MHz and thereby becomes a distortion which is inaudible to a man, the decoder having the above construction becomes the system which does not cause any inferior sound quality for a qualified subscriber.

It should also be noted that there are such systems as a widely known scramble system that is called the line permutation system in which picture area is divided at any points and substituted, and the line rotation system in which a plurality of horizontal lines in a field are divided into several blocks and the thus divided blocks are substituted, the scramble system including audio signal as explained above can also be also applied to these systems.

[Effect of the Invention]

It has been clarified by the above mentioned description that since one horizontal scanning line is divided into a horizontal blanking interval and a video signal interval and they are shifted in time series mode each other to enable the scramble, the video signal is not divided within a picture, also adjacent portions between the HBI and the VSI which are shifted each other (for example, the 130th and 780th clock of FIG. 1) are always kept at the pedestal level. Therefore, even if writing and reading a video signal to and from the line memory are repeated in the scramble and descramble processing, and also even if a jitter is generated in the video signals being transmitted or reproduced, it does not affect at all to the picture itself, whereby a scramble having characteristics of no deterioration of picture quality and a high grade concealment can be realized.

Also, while the HBI and the VSI are shifted each other, the HBI is deleted and the VSI is optionally time-shifted within the deleted interval, so that a scramble having higher grade concealment can be thereby realized.

Further, while the pedestal part of the specified H line within the vertical blanking interval is time-compressed for the specified interval, the pedestal part of the specified H line within the same field is time-expanded, and thus the signal is scrambled, whereby a scramble having no deterioration of picture quality can be realized without affecting picture itself at all.

Still further, while the HBI and the VSI are shifted each other, the pedestal part of the specified H line within the VBI is time-compressed for the specified interval, the pedestal part of the specified H line within the same field is time-expanded, and thus the signal is scrambled, whereby, scramble having higher grade concealment can be realized.

Also, since the H line to be scrambled by using the pseudo random signal is randomly specified, even if a tapping device which is equipped with a random number generator generating the same random signal required to release the scrambled signal appears, the scramble pattern is easily changed which makes it impossible to conduct unqualified reception of the video signals.

And also, since the transmitting side and receiving side have the same random number generator and the scramble pattern is freely changed by only sending the initial value of the generated random number, a variety of scramble mode is made possible.

Further, since the cryptogram key can be sent by using a separate data channel apart from a video signal transmission channel in the CATV system, the random number setting data for scramble decoding which is multiplexed in the same channel as the video signal can be invalidated so that an unqualified TV watcher can not use it as it is, and thereby an unqualified tapping can be avoided more efficiently.

What is claimed is:

1. A method of scrambling a video signal which includes a horizontal blanking interval and a video signal interval, for omitting non-subscribers in a pay TV system, said method comprising the steps of:
   shifting said horizontal blanking interval and said video signal interval, to each others' position with respect to a time axis thereof within at least one horizontal scanning line; and
   combining said at least one horizontal scanning line in which said shifting operation is conducted and other horizontal scanning lines in which no shifting operation is conducted such that an original horizontal scanning line order is maintained in order to transmit a video signal in combined form;
   wherein said method further comprises the steps of:

deleting a horizontal blanking interval of at least one specified horizontal scanning line other than said horizontal scanning line in which said shifting operation is conducted;

shifting a video signal interval thus remaining in said specified horizontal scanning line within a time interval equal to said deleted horizontal blanking interval; and combining said specified horizontal scanning line in which said deleting and shifting operations are conducted in addition to said already scrambled two kinds of horizontal scanning lines, without changing the original horizontal scanning line order, so as to transmit a video signal in combined form.

2. A method of descrambling a video signal which is scrambled in such a method that a horizontal blanking interval in at least one specified horizontal scanning line is deleted and a video signal interval thus remaining in said specified horizontal scanning line is shifted within a time interval equal to said deleted horizontal blanking interval, said method comprising the steps of:

recovering the positional order of said deleted horizontal blanking interval to the initial normal position thereof; and, recovering the position order of said shifted remained video signal interval to the initial normal position thereof.

3. An apparatus for scrambling a video signal which includes a horizontal blanking interval and a video signal interval, for omitting non-subscribers in a pay TV system, said apparatus comprising:

shifting means for shifting said horizontal blanking interval and said video signal interval to each others' position with respect to a time axis thereof within at least one horizontal scanning line; and combining means for combining said at least one horizontal scanning line in which said shifting operation is conducted and those horizontal scanning lines in which no shifting operation is conducted such that an original horizontal scanning line order is maintained so as to transmit a video signal in said combined form;

wherein said apparatus further comprises:

deleting means for deleting said horizontal blanking interval of at least one specified horizontal scanning line other than said horizontal scanning line in which said shifting operation is conducted;

shifting means for shifting a video signal interval thus remained in said specific horizontal scanning line within a time interval equal to said deleted horizontal blanking interval; and a combining means for combining said horizontal scanning line in which said deleting and shifting operations are conducted in addition to already scrambled two kinds of horizontal scanning lines, such that an original horizontal scanning line order is maintained, so as to transmit a video signal in combined form.

4. An apparatus for scrambling a video signal which includes a horizontal blanking interval and a video signal interval, for omitting non-subscribers in a pay TV system, said apparatus comprising:

shifting means for shifting said horizontal blanking interval and said video signal interval to each others' position with respect to a time axis thereof within at least one horizontal scanning line; and combining means for combining said at least one horizontal scanning line in which said shifting operation is conducted and those horizontal scanning lines in which no shifting operation is conducted such that an original horizontal scanning line order is maintained so as to transmit a video signal in said combined form;

wherein said apparatus further comprises:

deleting means for deleting said horizontal blanking interval of at least one specified horizontal scanning line other than said horizontal scanning line in which said shifting operation is conducted;

shifting means for shifting a video signal interval thus remained in said specific horizontal scanning line within a time interval equal to said deleted horizontal blanking interval; and, combining means for combining said horizontal scanning line in which said deleting and shifting operations are conducted in addition to already scrambled two kinds of horizontal scanning lines such that an original horizontal scanning line order is maintained so as to transmit a video signal in combined form;

wherein said shifting means further comprises:

a memory means;

a pseudo random number generating means;

a setting means for specifying the clocking point of said remained video signal interval with respect to said horizontal scanning line specified by said pseudo random number generating means; and an address table for specifying a writing starting point indicating at which address in said memory means said set clocking point starts to be written.

5. An apparatus for descrambling a video signal which is scrambled in such a method that a horizontal blanking interval in at least one specified horizontal scanning line is deleted and a video signal interval thus remaining in said specified horizontal scanning line is shifted within a time interval equal to said deleted horizontal blanking interval; said apparatus comprising:

recovering means for recovering the position of said deleted horizontal blanking interval to the initial normal position thereof; and recovering means for recovering the position of said shifted remained video signal to the initial normal position thereof, wherein said recovering means further comprises a pseudo random number generating means that is capable of generating the same random number used in said scrambled method.

* * * * *